US006499290B1

(12) United States Patent
Nakamura et al.

(10) Patent No.: US 6,499,290 B1
(45) Date of Patent: Dec. 31, 2002

(54) ENGINE EXHAUST PURIFICATION DEVICE

(75) Inventors: Takeshi Nakamura, Yokohama (JP); Ritsuo Sato, Yokohama (JP); Shigeaki Kakizaki, Yokohama (JP); Masatomo Kakuyama, Yokohama (JP); Osamu Matsuno, Ayase (JP)

(73) Assignee: Nissan Motor Co., Ltd., Yokohama (JP)

( * ) Notice: Subject to any disclaimer, the term of this patent is extended or adjusted under 35 U.S.C. 154(b) by 140 days.

(21) Appl. No.: 09/958,022

(22) PCT Filed: Feb. 5, 2001

(86) PCT No.: PCT/JP01/00799

§ 371 (c)(1),
(2), (4) Date: Oct. 2, 2001

(87) PCT Pub. No.: WO01/57369

PCT Pub. Date: Aug. 9, 2001

(30) Foreign Application Priority Data

| Feb. 3, 2000 | (JP) | ......................... 2000-026284 |
| Feb. 10, 2000 | (JP) | ......................... 2000-034046 |

(51) Int. Cl.$^7$ ................................................ F01N 3/00
(52) U.S. Cl. ............................. 60/274; 60/276; 60/277
(58) Field of Search .................... 60/274, 276, 277, 60/299

(56) References Cited

U.S. PATENT DOCUMENTS

| 5,609,023 A | | 3/1997 | Katoh et al. ................... 60/276 |
| 5,661,972 A | * | 9/1997 | Katoh et al. ................... 60/276 |
| 5,737,916 A | * | 4/1998 | Mitsutani ..................... 60/276 |
| 5,839,274 A | * | 11/1998 | Remboski et al. ............. 60/276 |
| 5,842,340 A | | 12/1998 | Bush et al. .................... 60/274 |
| 5,875,628 A | * | 3/1999 | Mitsutani .................... 123/688 |
| 6,116,021 A | * | 9/2000 | Schumacher et al. ....... 123/674 |
| 6,185,933 B1 | * | 2/2001 | Tsuzuki et al. ............... 60/276 |
| 6,289,673 B1 | | 9/2001 | Tayama et al. ............... 60/285 |
| 6,336,320 B1 | * | 1/2002 | Tanaka et al. .............. 123/443 |

FOREIGN PATENT DOCUMENTS

| EP | 0 885 657 | 12/1998 |
| EP | 0 930 425 | 7/1999 |
| JP | 9-228873 | 9/1997 |
| WO | 95/35152 | 12/1995 |

* cited by examiner

Primary Examiner—Thomas Denion
Assistant Examiner—Diem Tran
(74) Attorney, Agent, or Firm—Foley & Lardner

(57) ABSTRACT

A controller (6) controls an air-fuel ratio of an engine (1) so that an oxygen storage amount of a catalyst (3) provided in an exhaust passage (2) is maintained constant. At this time, the controller (6) computes or estimates the oxygen storage amount separately for a first amount and a second amount, where the first amount is estimated based on a relationship between the first and second amount. The controller (6) controls the air/fuel ratio based on the estimated first amount.

90 Claims, 17 Drawing Sheets

ENGINE EXHAUST PURIFICATION DEVICE

FIELD OF THE INVENTION

The present invention relates to an engine exhaust purification device provided with a catalyst.

BACKGROUND OF THE INVENTION

JP-A-H9-228873 published by the Japanese Patent Office in 1997 discloses a technique wherein an oxygen amount stored in a three-way catalyst (hereafter, "oxygen storage amount") is estimated based on an engine intake air amount and an air fuel ratio of an exhaust flowing into the catalyst, and engine air-fuel ratio control is performed so that the oxygen storage amount of the catalyst remains constant.

To maintain the NOx (nitrogen oxides), CO and HC (hydrocarbon) conversion efficiency of the three-way catalyst at a maximum, the catalyst atmosphere must be maintained at the stoichiometric air-fuel ratio. If the oxygen storage amount of the catalyst is maintained constant, oxygen in the exhaust is stored in the catalyst even if the air-fuel ratio of the exhaust flowing into the catalyst temporarily becomes lean. Conversely, oxygen stored in the catalyst is released even if the air-fuel ratio of the exhaust flowing into the catalyst temporarily becomes rich, so the catalyst atmosphere can be maintained at the stoichiometric air-fuel ratio.

In an exhaust purification device which performs this control, the conversion efficiency of the catalyst depends on the oxygen storage amount of the catalyst. Therefore, the oxygen storage amount must be precisely computed to control the oxygen storage amount to be constant and maintain the conversion efficiency of the catalyst at a high level.

SUMMARY OF THE INVENTION

It would be an advantage to precisely compute an oxygen storage amount in an exhaust purification device for controlling the air fuel ratio of an engine provided with a three-way catalyst so as to maintain the oxygen amount constant, and to maintain the conversion efficiency of the catalyst at a high level.

According to one embodiment there is provided an exhaust purification device for an engine, the device comprising a catalyst provided in an exhaust passage of the engine, a front sensor which detects an oxygen concentration in the exhaust gas flowing into the catalyst, and a microprocessor programmed to compute an oxygen storage amount of the catalyst separately for a high speed component which has a rapid oxygen storage rate and a low speed component which has a slower storage rate than that of the high speed component based on the oxygen concentration of the exhaust gas, assuming that when oxygen is released, the oxygen is released preferentially from the high speed component rather than from the low speed component when the ratio of the low speed component to the high speed component is less than a predetermined value, and control the air-fuel ratio of the engine based on the computed oxygen storage amount so that the oxygen storage amount of the catalyst is a predetermined amount.

According to another embodiment, there is provided a method of estimating an oxygen storage amount of a catalyst within a catalytic converter coupled to an engine. The method comprises estimating a first amount of oxygen stored in the catalyst, the first amount representing a part of the oxygen storage amount, the first amount estimated to change at a first rate; estimating a second amount of oxygen stored in the catalyst, the second amount representing another part of the oxygen storage amount; and wherein the first rate is estimated based on a relationship between the first amount and the second amount.

According to yet another embodiment, there is provided a method of estimating an oxygen storage amount of a catalyst within a catalytic converter coupled to an engine. The method comprises estimating a first amount of oxygen stored in the catalyst, the first amount representing a part of the oxygen storage amount, the first amount estimated to be stored at a first rate; estimating a second amount of oxygen stored in the catalyst, the second amount representing another part of the oxygen storage amount; and wherein the first rate is estimated based on a relationship between the first amount and the second amount.

According to yet another embodiment, there is provided a method of estimating an oxygen storage amount of a catalyst within a catalytic converter coupled to an engine. The method comprises estimating a first amount of oxygen stored in the catalyst, the first amount representing a part of the oxygen storage amount, the first amount estimated to be released at a first rate; estimating a second amount of oxygen stored in the catalyst, the second amount representing another part of the oxygen storage amount; and wherein the first rate is estimated based on a relationship between the first amount and the second amount.

According to yet another embodiment, there is provided a method of controlling the oxygen storage amount of a catalyst within a catalytic converter coupled to an engine. The method comprises estimating a first amount of oxygen stored in the catalyst, the first amount representing a part of the oxygen storage amount, the first amount estimated to change at a first rate; estimating a second amount of oxygen stored in the catalyst, the second amount representing another part of the oxygen storage amount; wherein the first rate is estimated based on a relationship between the first amount and the second amount; and controlling an air/fuel ratio of the engine based on the estimated first amount.

According to yet another embodiment, there is provided a method of controlling the oxygen storage amount of a catalyst within a catalytic converter coupled to an engine. The method comprises estimating a first amount of oxygen stored in the catalyst, the first amount representing a part of the oxygen storage amount, the first amount estimated to be stored at a first rate; estimating a second amount of oxygen stored in the catalyst, the second amount representing another part of the oxygen storage amount; and wherein the first rate is estimated based on a relationship between the first amount and the second amount; and controlling an air/fuel ratio of the engine based on the estimated first amount.

According to yet another embodiment, there is provided a method of controlling the oxygen storage amount of a catalyst within a catalytic converter coupled to an engine. The method comprises estimating a first amount of oxygen stored in the catalyst, the first amount representing a part of the oxygen storage amount, the first amount estimated to be released at a first rate; estimating a second amount of oxygen stored in the catalyst, the second amount representing another part of the oxygen storage amount; wherein the first rate is estimated based on a relationship between the first amount and the second amount; and controlling an air/fuel ratio of the engine based on the estimated first amount.

According to yet another embodiment, there is provided an exhaust purification device for an engine. The device comprises a catalyst provided in an exhaust passage of the engine; a front sensor which detects an oxygen concentration of oxygen flowing into the catalyst; and a microprocessor programmed to: estimate a first amount of oxygen stored in the catalyst, the first amount estimated to change at a first rate; estimate a second amount of oxygen stored in the catalyst; wherein the first rate is estimated based on the oxygen concentration and a relationship between the first amount and the second amount; and control an air/fuel ratio of the engine based on the estimated first amount.

According to yet another embodiment, there is provided an exhaust purification device for an engine. The device comprises a catalyst provided in an exhaust passage of the engine; a front sensor which detects an excess oxygen concentration of oxygen flowing into the catalyst; and a microprocessor programmed to: estimate a first amount of oxygen stored in the catalyst, the first amount estimated to be stored at a first rate; estimate a second amount of oxygen stored in the catalyst; wherein the first rate is estimated based on the excess oxygen concentration and a relationship between the first amount and the second amount; and control an air/fuel ratio of the engine based on the estimated first amount.

According to yet another embodiment, there is provided an exhaust purification device for an engine. The device comprises a catalyst provided in an exhaust passage of the engine; a front sensor which detects a deficient oxygen concentration of oxygen flowing into the catalyst; and a microprocessor programmed to: estimate a first amount of oxygen stored in the catalyst, the first amount estimated to be released at a first rate; estimate a second amount of oxygen stored in the catalyst; wherein the first amount is estimated based on the deficient oxygen concentration and a relationship between the first amount and the second amount; and control an air/fuel ratio of the engine based on the estimated first amount.

The details as well as other features and advantages of this invention are set forth in the remainder of the specification and are shown in the accompanying drawings.

DESCRIPTION OF THE PREFERRED EMBODIMENTS

It is difficult to precisely compute the oxygen storage amount of the catalyst by prior art computational methods.

This is because, although the oxygen storage amount actually may depend on two different characteristics wherein oxygen is stored and released at high speed by a noble metal in the catalyst, and oxygen is stored and released at low speed by an oxygen storage material, such as cerium oxide, in the catalyst, the oxygen storage amount was estimated and computed by one parameter in the prior art without considering this two rate mechanism.

Figure 1:
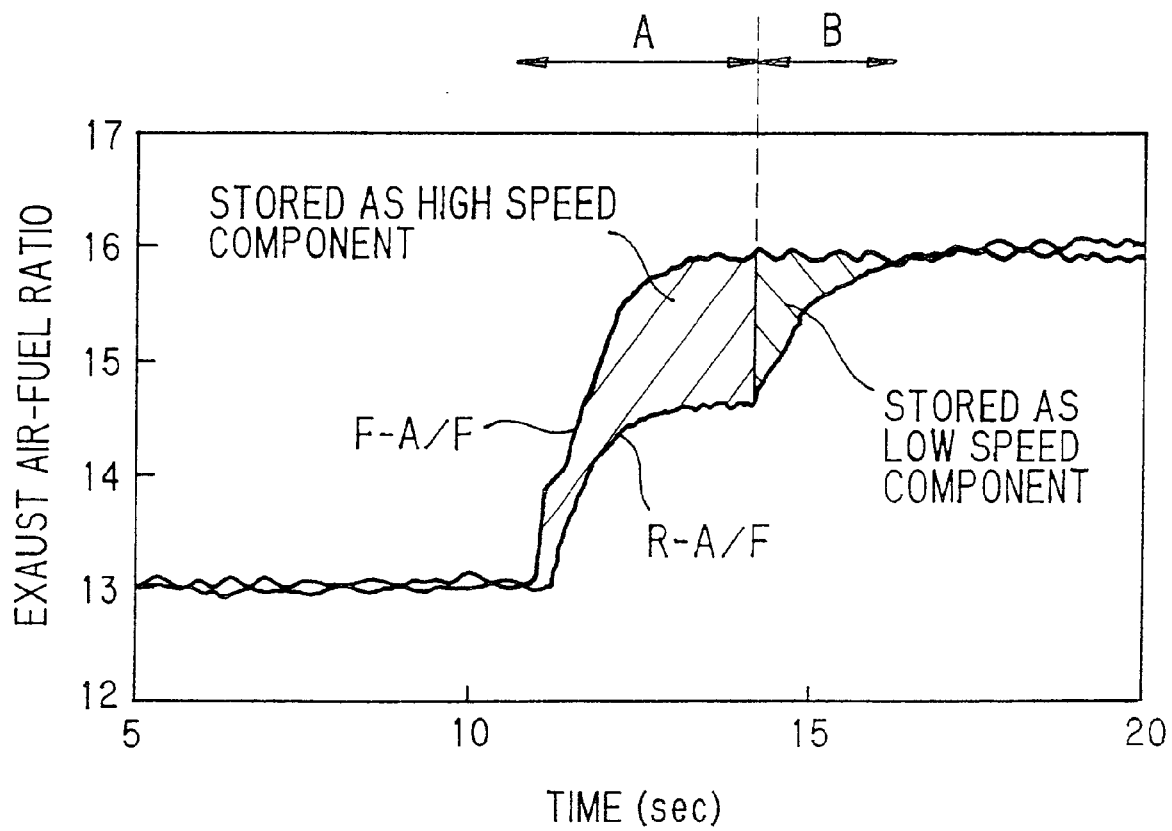
FIG. 1 shows measurement results for the exhaust air-fuel ratio before and after the catalyst when the exhaust air-fuel ratio is changed from rich to lean.

FIG. 1 shows the results of measuring the exhaust air-fuel ratio before and after the catalyst when the air fuel ratio in the exhaust flowing into the catalyst is changed from 13 to 16.

In an interval A, oxygen is stored rapidly in the catalyst, all the oxygen flowing into the catalyst is stored therein even if the air fuel ratio (F-A/F) of the exhaust flowing into the catalyst is lean, and the catalyst atmosphere (R-A/F) is the stoichiometric air-fuel ratio.

In a later interval B, not all the oxygen flowing into the catalyst is stored in the catalyst, and the catalyst atmosphere (R-A/F) is lean. However, even in this interval B, oxygen is stored in the catalyst although storage takes place slowly.

The reason why storage takes place in two stages in this way is because, in addition to a noble metal such as platinum or rhodium, the catalyst comprises oxygen storage materials such as cerium oxide or barium and a base metal. Whereas noble metals adsorb oxygen in the molecular state, oxygen storage materials, such as cerium oxide, absorb oxygen as compounds by chemical combination. In other words, a difference arises in the oxygen storage rate due to a difference in the way oxygen is stored by the noble metal and the oxygen storage material. When oxygen is released, the reverse actions take place.

Strictly speaking, as mentioned above, it is believed that noble metals adsorb oxygen in the molecular state, and oxygen storage materials absorb oxygen as compounds, but in the following description, adsorption and absorption will be collectively referred to as storage.

Further, in this application the expression "the exhaust air-fuel ratio is rich" means that the oxygen concentration in the exhaust is lower than the oxygen concentration in the exhaust when the engine is running at the stoichiometric air-fuel ratio. The expression "the exhaust air-fuel ratio is lean" means that the oxygen concentration in the exhaust is higher than the oxygen concentration in the exhaust when the engine is running at the stoichiometric air-fuel ratio. The expression "the exhaust air-fuel ratio is stoichiometric" means that the oxygen concentration of the exhaust is equal to the oxygen concentration in the exhaust when the engine is running at the stoichiometric air-fuel ratio.

Figure 2:
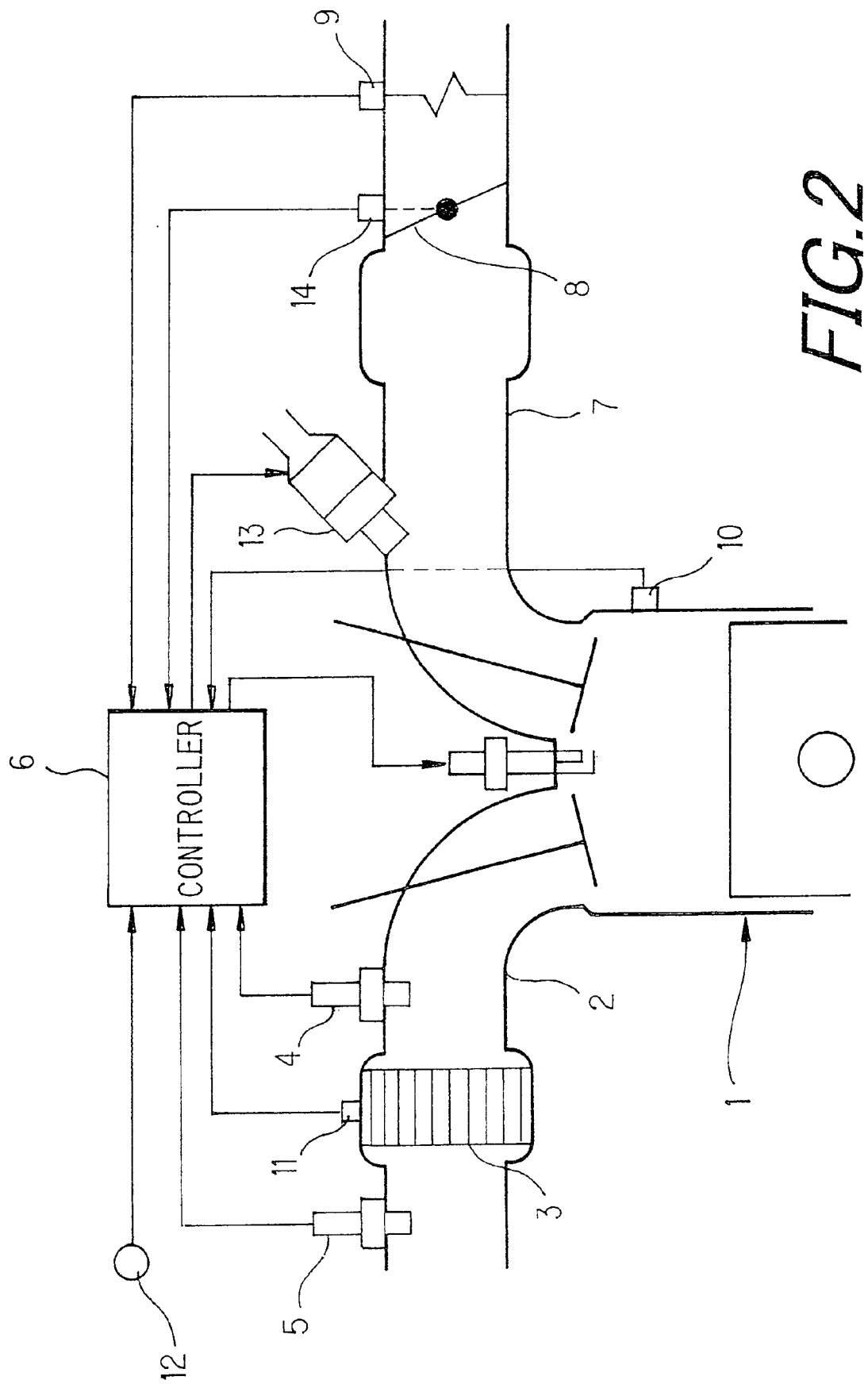
FIG. 2 is a schematic diagram of an exhaust purification device according to an embodiment of this invention.

Referring to FIG. 2 of the drawings, a fuel injection valve 13 is provided downstream of a throttle 8 in an air intake passage 7 of an engine 1. The fuel injection valve 13 injects fuel into the intake air to achieve a predetermined air-fuel ratio according to running conditions and based on an injection signal from a controller 6.

A rotation speed signal from a crank angle sensor 12, intake air amount signal from an air flow meter 9, cooling water temperature signal from a water temperature sensor 10 and throttle opening signal from a throttle opening sensor 14, are input to the controller 6. The controller 6 determines the running state based on these signals, determines a fuel injection amount Tp which achieves a basic air-fuel ratio, computes a fuel injection amount Ti by performing various corrections on Tp, and performs fuel injection control by converting Ti into an injection signal.

A catalyst 3 is provided in an exhaust passage 2. The catalyst 3 performs reduction of NOx and oxidation of HC and CO in the exhaust with a maximum conversion efficiency when the catalyst atmosphere is at the stoichiometric air-fuel ratio. At this time, in the catalyst 3, the catalyst atmosphere is maintained at the stoichiometric air-fuel ratio by correcting any excess or deficiency of oxygen produced due to temporary fluctuation of the exhaust air-fuel ratio.

Here, the oxygen storage amount of the catalyst 3 may be partitioned into a high speed component (amount) HO2 which is believed to be stored and released by a noble metal (Pt, Rh, Pd), in the catalyst and a low speed component (amount) LO2 which is believed to be stored and released by an oxygen storage material in the catalyst 3. The low speed component LO2 represents the storage and release of a larger amount of oxygen than the high speed component HO2, but its storage/release rate is slower than that of the high speed component HO2.

Further, this high speed component HO2 and low speed component LO2 have characteristics that are modeled as follows:

When oxygen is stored, oxygen is stored preferentially as the high speed component HO2, and begins to be stored as the low speed component LO2 only when the high speed component HO2 has reached a maximum capacity HO2MAX, and oxygen can no longer be stored as the high speed component HO2.

When oxygen is released, and the ratio of the low speed component LO2 to the high speed component HO2 (LO2/HO2) is less than a predetermined value, i.e. when the high speed component is relatively large, oxygen is preferentially released from the high speed component HO2. When the ratio of the low speed component LO2 to the high speed component HO2 is larger than the predetermined value, oxygen is released from both the high speed component HO2 and low speed component LO2 so that the ratio of the low speed component LO2 to the high speed component HO2 does not vary.

Figure 3:
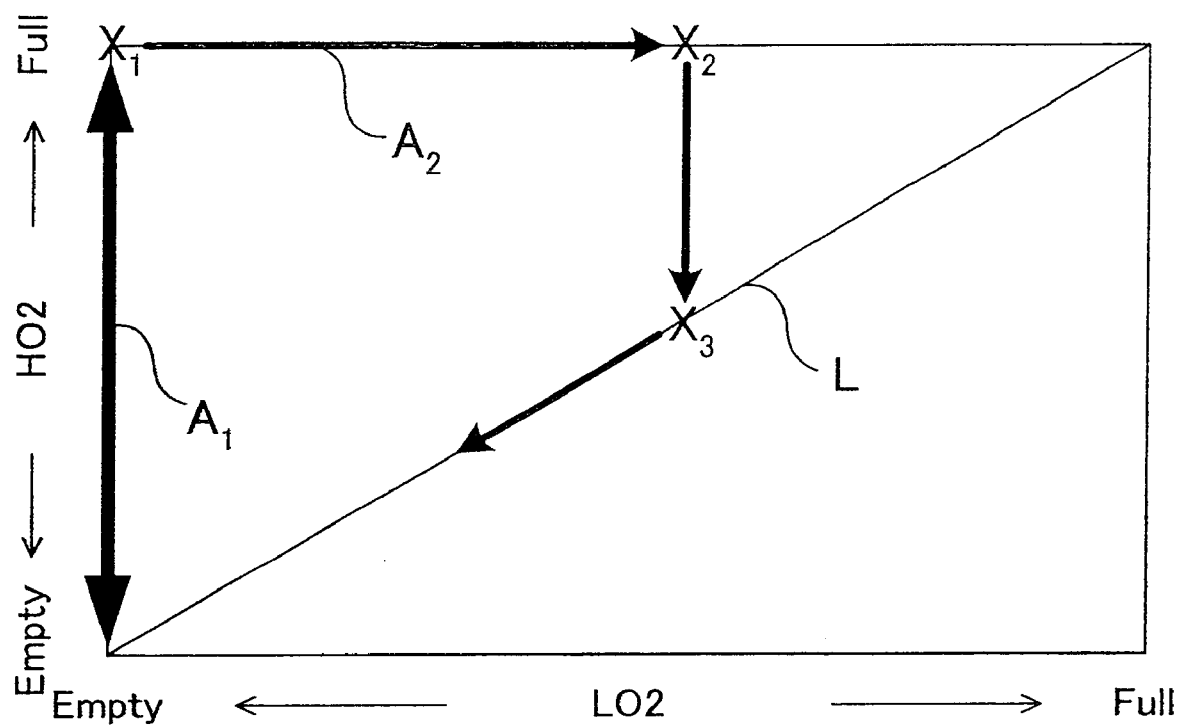
FIG. 3 is a diagram showing the oxygen release characteristics of a catalyst.

FIG. 3 shows the oxygen storage/release characteristics of the catalyst. The vertical axis shows the high speed component HO2 (oxygen amount stored in the noble metal) and the horizontal axis shows the low speed component LO2 (oxygen amount stored in the oxygen storage material).

During normal running conditions, the low speed component LO2 is almost zero and only the high speed component HO2 varies according to the air-fuel ratio of the exhaust flowing into the catalyst as shown by the arrow $A_1$ in the FIG. 3. The high speed component HO2 is controlled, for example, to be half of its maximum capacity.

However, when the engine fuel cut is performed or when the engine is restarted from a warmed-up state (hot restart), the high speed component HO2 reaches its maximum capacity and oxygen is stored as the low speed component LO2 as shown by arrow $A_2$ in FIG. 3. In this case, the oxygen storage amount varies from the point $X_1$ to the point $X_2$.

When the oxygen is released at point $X_2$, oxygen is preferentially released from the high speed component HO2. When the ratio of the low speed component LO2 to the high speed component HO2 reaches the predetermined value at $X_3$ in FIG. 3, oxygen is released from both the high speed component HO2 and the low speed component LO2 so that the ratio of the low speed component LO2 to the high speed component HO2 does not vary, i.e., oxygen is released while moving on a straight line L as shown in FIG. 3. Here, on line L, the constant ratio of the low speed component to the high speed component is from 5 to 15, but preferably approximately 10, relative to the high speed component 1.

Returning to FIG. 2, a front wide range air-fuel ratio sensor 4 (hereafter referred to as front A/F sensor) provided upstream of the catalyst 3 outputs a voltage according to the air-fuel ratio of the exhaust flowing into the catalyst 3. A rear oxygen sensor 5 provided downstream of the catalyst 3 detects whether the exhaust air-fuel ratio downstream of the catalyst 3 is rich or lean with the stoichiometric air-fuel ratio as a threshold value. Here, an economical oxygen sensor was provided downstream of the catalyst 3, but an A/F sensor which can detect the air fuel ratio continuously can be provided instead of the oxygen sensor.

The cooling water temperature sensor 10 which detects the temperature of the cooling water is fitted to the engine 1. The detected cooling water temperature is used for determining the running state of the engine 1, and also for estimating the catalyst temperature of the catalyst 3.

The controller 6 comprises a microprocessor, such as a RAM, ROM and I/O interface. The controller 6 computes the oxygen storage amount of the catalyst 3 (high speed component HO2 and low speed component LO2) based on the output of the air flow meter 9, front A/F sensor 4 and cooling water temperature sensor 10.

When the high speed component HO2 of the computed oxygen storage amount is greater than a predetermined amount, for example, half the maximum capacity HO2MAX of the high speed component, the controller 6 makes the air fuel ratio of the engine 1 rich thus making the air-fuel ratio of the exhaust flowing into the catalyst 3 rich and decreasing the high speed component HO2. Conversely, when the high speed component HO2 is less than the predetermined amount, the controller 6 makes the air fuel ratio of the engine 1 lean thus making the air-fuel ratio of the exhaust flowing into the catalyst 3 lean and increasing the high speed component HO2.

A discrepancy may arise between the computed oxygen storage amount and real oxygen storage amount due to computational error. In this case the controller 6 resets the computational value of the oxygen storage amount with a predetermined timing based on the air-fuel ratio of the exhaust downstream of the catalyst 3, and corrects this discrepancy from the real oxygen storage amount.

Specifically, when it is determined that the air-fuel ratio downstream of the catalyst 3 is lean based on the output of the rear oxygen sensor 5, it is determined that at least the high speed component HO2 has reached a maximum. In this case the high speed component HO2 is reset to maximum capacity. When it is determined by the rear oxygen sensor 5 that the air fuel ratio downstream of the catalyst 3 is rich, oxygen is no longer being released from either the high speed component HO2 or the low speed component LO2. In this case the high speed component HO2 and low speed component LO2 are reset to minimum capacity.

Next, the control performed by the controller 6 will be described.

The estimation and computation of the oxygen storage amount will first be described, followed by resetting of the computational value of the oxygen storage amount, and finally air-fuel ratio control of the engine 1 based on the oxygen storage amount.

Figure 4:
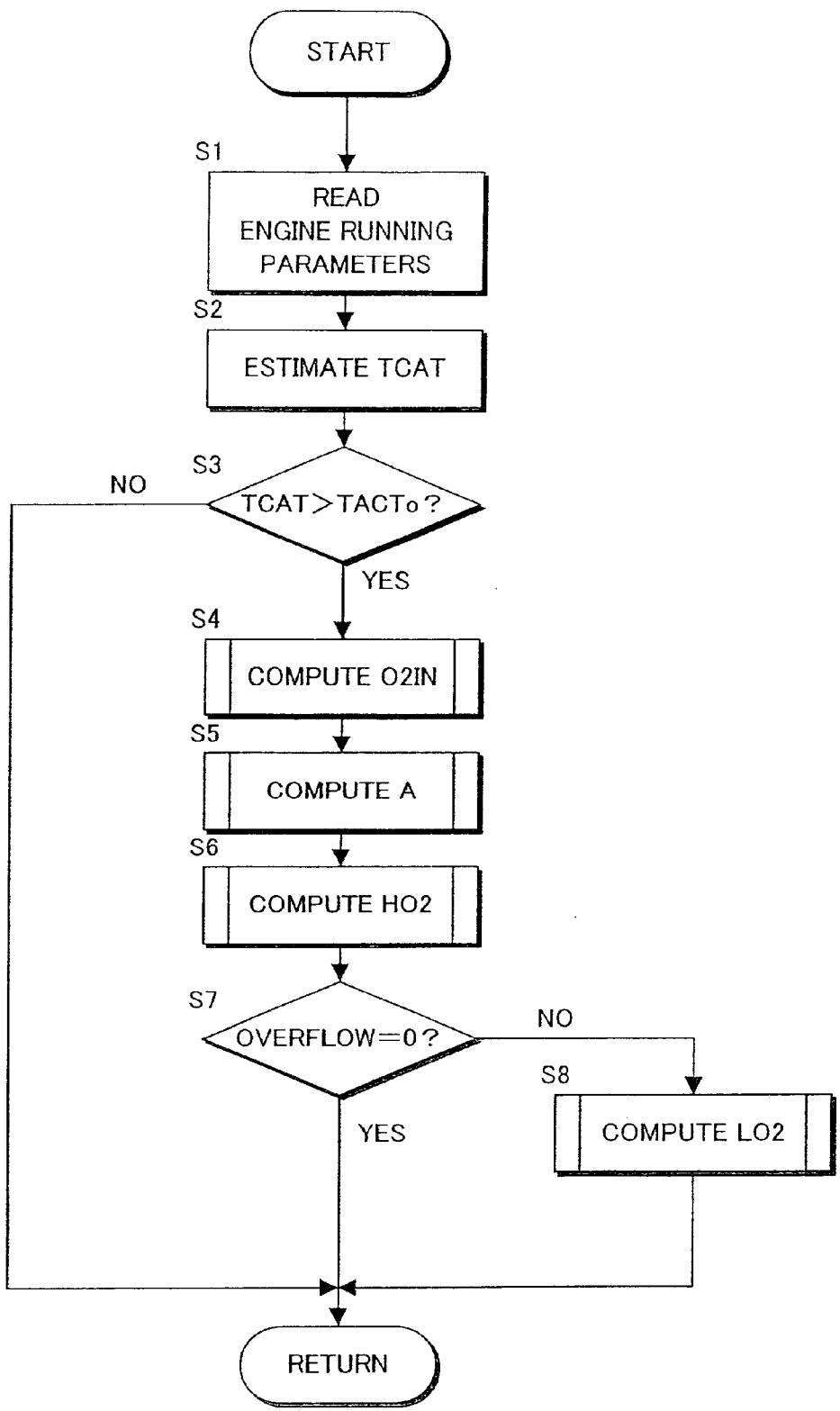
FIG. 4 is a flowchart showing a routine for computing an oxygen storage amount of the catalyst.

FIG. 4 shows a main routine for computing or estimating the oxygen storage amount of the catalyst 3. This computation is performed at predetermined intervals by the controller 6.

According to this routine, first, in a step S1, the outputs of the cooling water temperature sensor 10, crank angle sensor 12 and air flow meter 9 are read as running parameters of the engine 1. In a step S2, a temperature TCAT of the catalyst 3 is estimated based on these parameters. In a step S3, by comparing the estimated catalyst temperature TCAT and a catalyst activation temperature TACTo, such as 300° C., for example, it is determined whether or not the catalyst 3 has been activated.

When it is determined that the catalyst activation temperature TACTo has been reached, the routine proceeds to a step S4 to compute the oxygen storage amount of the catalyst 3. When it is determined that the catalyst activation temperature TACTo has not been reached, processing is terminated because in this case it is assumed that the catalyst 3 does not store or release oxygen.

In the step S4, a subroutine (FIG. 5) for computing an oxygen excess/deficiency amount O2IN is performed, and the oxygen excess/deficiency amount of the exhaust flowing into the catalyst 3 is computed. In a step S5, a subroutine (FIG. 6) for computing an oxygen release rate A of the high speed component of the oxygen storage amount is performed, and the oxygen release rate A of the high speed component is computed.

Further, in a step S6, a subroutine (FIG. 7) for computing the high speed component HO2 of the oxygen storage amount is performed. In this step, the high speed component HO2 and an oxygen amount OVERFLOW overflowing into the low speed component LO2 without being stored as the high speed component HO2 are computed based on the oxygen excess/deficiency amount O2IN and the oxygen release rate A of the high speed component.

In a step S7, it is determined whether or not all of the oxygen excess/deficiency amount O2IN flowing into the catalyst 3 has been stored as the high speed component HO2 based on the overflow oxygen amount OVERFLOW. When all of the oxygen excess/deficiency amount O2IN has been stored as the high speed component (i.e., OVERFLOW=0), processing is terminated. Otherwise, the routine proceeds to a step S8, a subroutine (FIG. 8) is performed for computing the low speed component LO2, and the low speed component LO2 is computed based on the overflow oxygen amount OVERFLOW overflowing from the high speed component HO2.

Here, the catalyst temperature TCAT is estimated from the cooling water temperature of the engine 1, the engine load and the engine rotation speed. Alternatively a temperature sensor 11 may also be attached to the catalyst 3 as shown in FIG. 2, and the temperature of the catalyst 3 measured directly.

When the catalyst temperature TCAT is less than the activation temperature TACTo, the oxygen storage amount is not computed in FIG. 4. Alternatively, the step S3 may be eliminated, and the effect of the catalyst temperature TCAT may be reflected in the oxygen release rate A of the high speed component or an oxygen storage/release rate B of the low speed component, described later.

Next, subroutines performing steps S4 to S6 and step S8 will be described.

Figure 5:
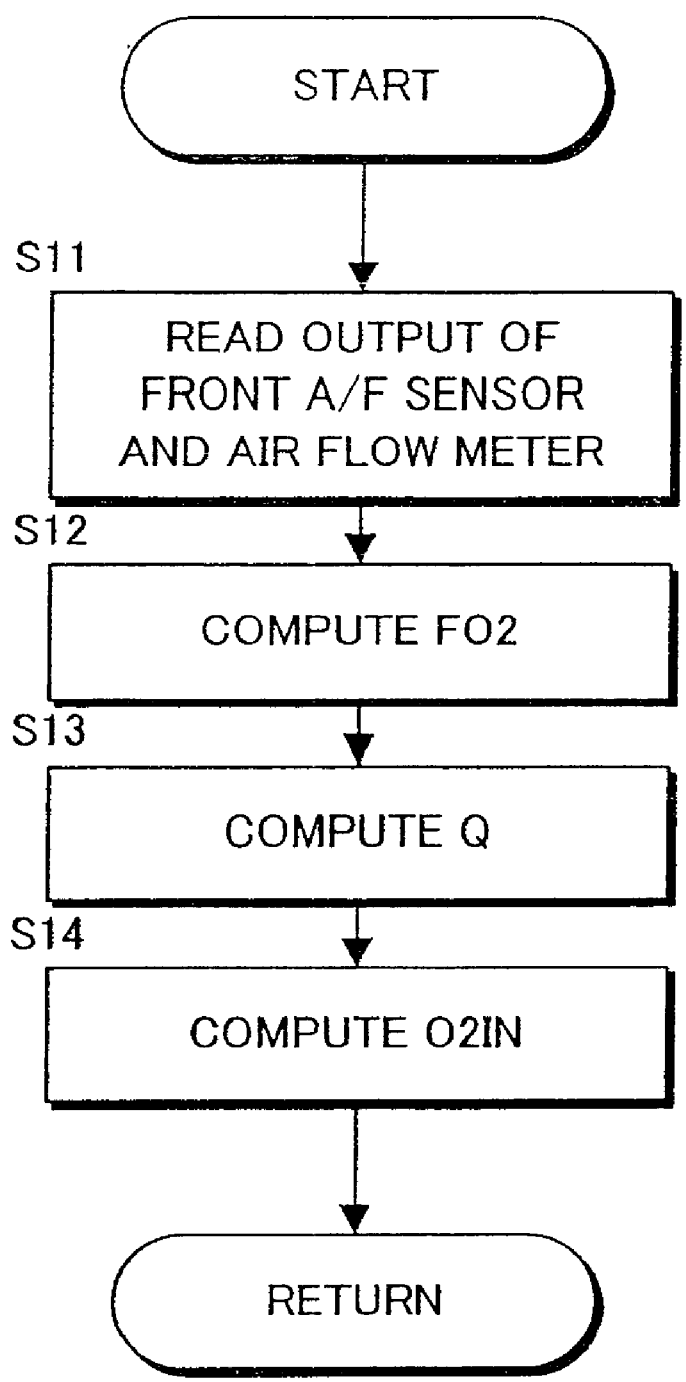
FIG. 5 is a flowchart showing a subroutine for computing an oxygen excess/deficiency amount in exhaust flowing into the catalyst.

FIG. 5 shows the subroutine for computing the oxygen excess/deficiency amount O2IN of the exhaust flowing into the catalyst 3. In this subroutine, the oxygen excess/deficiency amount O2IN of the exhaust flowing into the catalyst 3 is computed based on the air-fuel ratio of the exhaust upstream of the catalyst 3 and the intake air amount of the engine 1.

First, in a step S11, the output of the front A/F sensor 4 and the output of the air flow meter 9 are read.

Next, in a step S12, the output of the front A/F sensor 4 is converted to an excess/deficiency oxygen concentration FO2 of the exhaust flowing into the catalyst 3 using a predetermined conversion table. Here, the excess/deficiency oxygen concentration FO2 is a relative concentration relative to the oxygen concentration at the stoichiometric air-fuel ratio. If the exhaust air-fuel ratio is equal to the stoichiometric air-fuel ratio, it is zero, if it is richer than the stoichiometric air-fuel ratio it is negative, and if it is leaner than the stoichiometric air-fuel ratio, it is positive.

In a step S13, the output of the air flow meter 9 is converted to an intake air amount (Q×t) using a predetermined conversion table, where Q=exhaust gas flow rate represented by intake air flow rate, and t=cycle time. In a step S14, the intake air amount (Q×t) is multiplied by the excess/deficiency oxygen concentration FO2 to compute the excess/deficiency oxygen amount O2IN of the exhaust flowing into the catalyst 3.

As the excess/deficiency oxygen concentration FO2 has the above characteristics, the excess/deficiency oxygen amount O2IN is zero when the exhaust flowing into the catalyst 3 is at the stoichiometric air-fuel ratio, a negative value when it is rich, and a positive value when it is lean.

Figure 6:
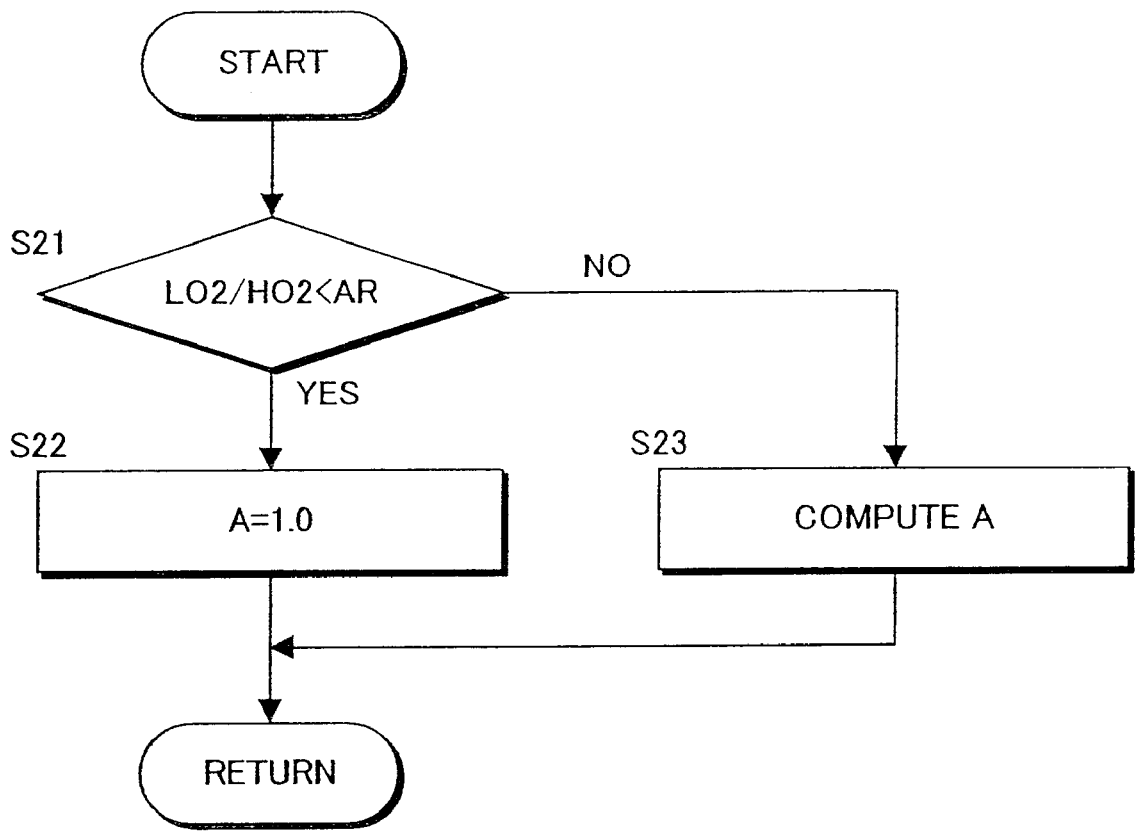
FIG. 6 is a flowchart showing a subroutine for computing an oxygen release rate of a high speed component.

FIG. 6 shows a subroutine for computing the oxygen release rate A of the high speed component of the oxygen storage amount. In this subroutine, the oxygen release rate of the high speed component HO2 is presumed to be affected by the low speed component LO2, and the oxygen release rate A of the high speed component is computed taking into account the low speed component LO2.

First, in a step S21, it is determined whether or not a ratio LO2/HO2 of low speed component relative to the high speed component is less than a predetermined threshold value AR, such as AR=10, for example. When it is determined that the ratio LO2/HO2 is less than the predetermined value AR, i.e., when the high speed component HO2 is relatively large compared with the low speed component LO2, the routine proceeds to a step S22, and the oxygen release rate A of the high speed component is set to 1.0 expressing the fact that oxygen is released only from the high speed component HO2.

On the other hand, when it is determined that the ratio LO2/HO2 is not less than the predetermined threshold value AR, oxygen is released from the high speed component HO2 and the low speed component LO2 so that the ratio of the low speed component LO2 to the high speed component HO2 does not vary. The routine then proceeds to a step S23, and a value of the oxygen release rate A of the high speed component is computed which does not cause the ratio LO2/HO2 to vary.

Figure 7:
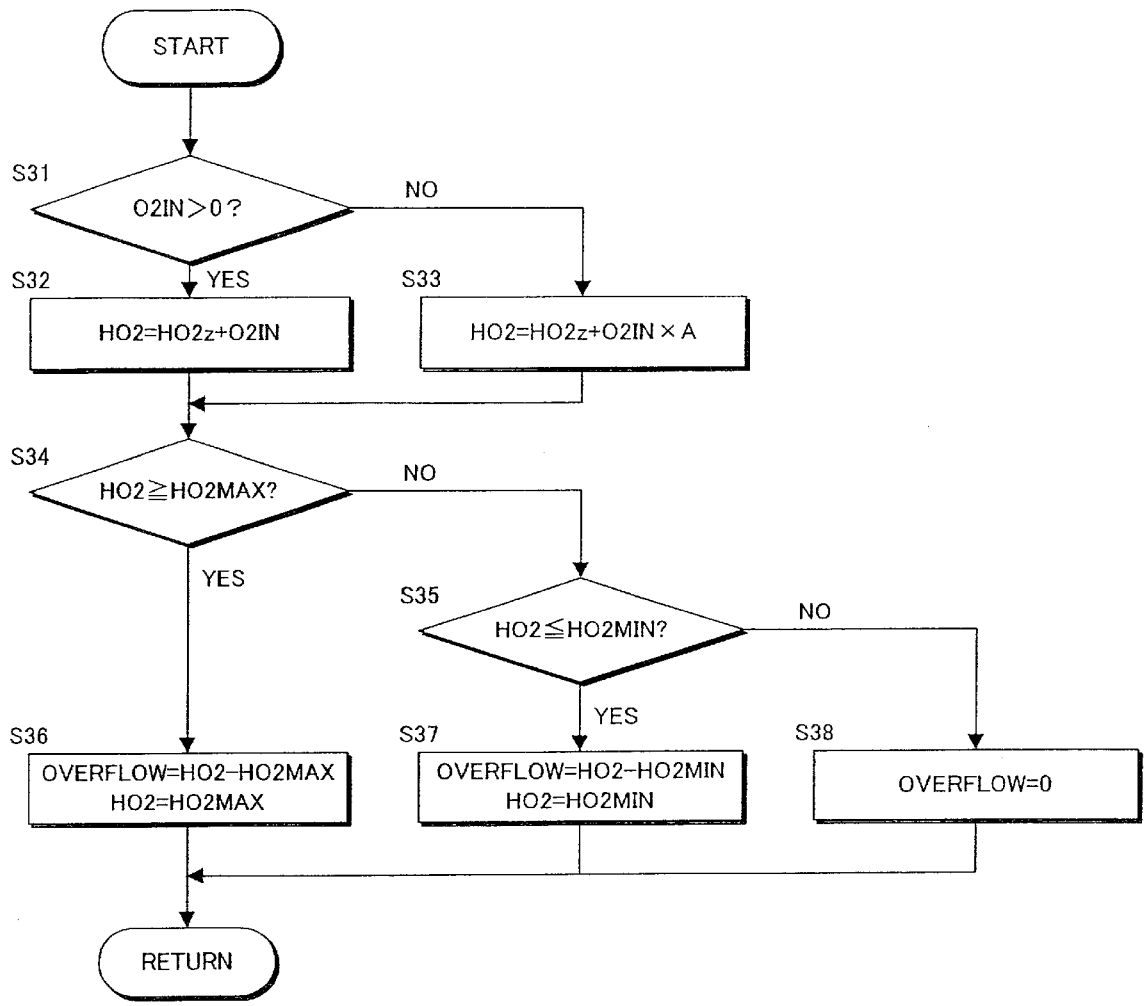
FIG. 7 is a flowchart showing a subroutine for computing the high speed component of the oxygen storage amount.

FIG. 7 shows a subroutine for computing the high speed component HO2 of the oxygen storage amount. In this subroutine, the high speed component HO2 is computed based on the oxygen excess/deficiency amount O2IN of the exhaust flowing into the catalyst 3 and the oxygen release rate A of the high speed component.

First, it is determined in a step S31 whether or not the high speed component HO2 is being stored or is being released based on the oxygen excess/deficiency amount O2IN.

When the air-fuel ratio of the exhaust flowing into the catalyst 3 is lean and the oxygen excess/deficiency amount O2IN is thus larger than zero, it is determined that the high speed component HO2 is being stored. The routine then proceeds to a step S32, and the high speed component HO2 is computed or estimated from the following equation (1):

$$HO2 = HO2z + O2IN \quad (1)$$

where: $O2IN = FO2 \times Q \times t$, $HO2z$=value of high speed component HO2 on the immediately preceding occasion. Thus, in this case the high speed component HO2 increases by the oxygen excess/deficiency amount O2IN.

On the other hand, when it is determined that the oxygen excess/deficiency amount O2IN is less than zero and the high speed component is being released, the routine proceeds to a step S33, and the high speed component HO2 is computed from the following equation (2):

$$HO2 = HO2z + O2IN \times A \quad (2)$$

where: A=oxygen release rate of the high speed component HO2.

In steps S34, S35, it is determined whether or not the computed HO2 exceeds the maximum capacity HO2MAX of the high speed component, or whether or not it is less than a minimum capacity HO2MIN, such as HO2MIN=0, for example.

When the high speed component HO2 is greater than the maximum capacity HO2MAX, the routine proceeds to a step S36, and the overflow oxygen amount (excess amount) OVERFLOW flowing into the catalyst without being stored as the high speed component HO2 is computed from the following equation (3):

$$OVERFLOW = HO2 - HO2MAX \quad (3)$$

In this case the high speed component HO2 is limited to the maximum capacity HO2MAX.

When the high speed component HO2 is less than the minimum capacity HO2MIN, the routine proceeds to a step S37, and the overflow oxygen amount (deficiency amount) OVERFLOW which was not stored as part of the high speed component HO2 is computed by the following equation (4):

$$OVERFLOW = HO2 - HO2MIN \quad (4)$$

In this case the high speed component HO2 is limited to the minimum capacity HO2MIN. Here, zero is given as the minimum capacity HO2MIN, so the oxygen amount which is deficient when all the high speed component HO2 has been released is computed as a negative overflow oxygen amount.

When the high speed component HO2 lies between the maximum capacity HO2MAX and minimum capacity HO2MIN, the oxygen excess/deficiency amount O2IN of the exhaust flowing into the catalyst 3 is all stored as the high speed component HO2, and zero is set to the overflow oxygen amount OVERFLOW.

When the high speed component HO2 is greater than the maximum capacity HO2MAX or less than the minimum capacity HO2MIN, the overflow oxygen amount OVERFLOW which has overflowed from the high speed component HO2 is stored as the low speed component LO2.

Figure 8:
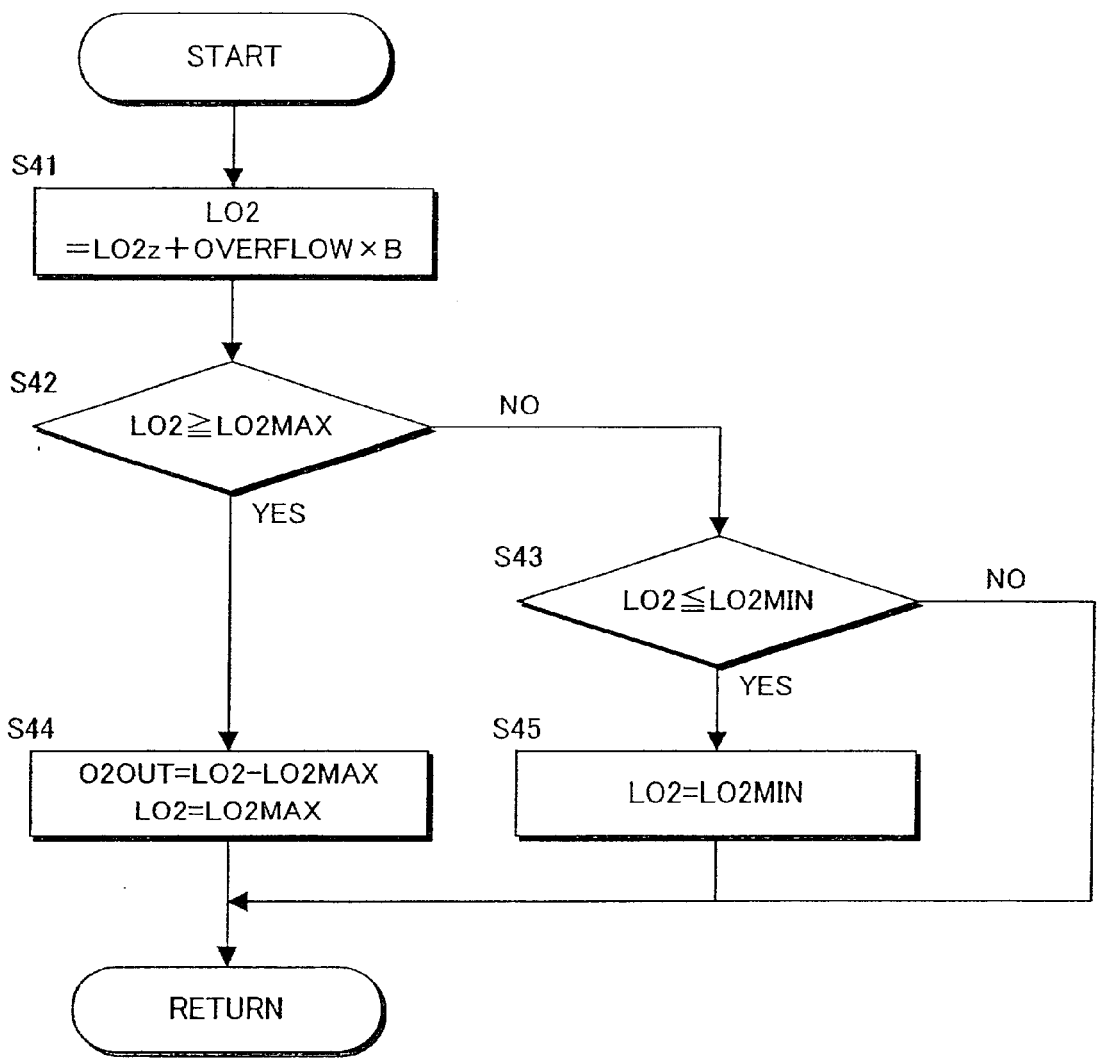
FIG. 8 is a flowchart showing a subroutine for computing a low speed component of the oxygen storage amount.

FIG. 8 shows a subroutine for computing the low speed component LO2 of the oxygen storage amount. In this subroutine, the low speed component LO2 is computed based on the overflow oxygen amount OVERFLOW which has overflowed from the high speed component HO2.

According to this subroutine, in a step S41, the low speed component LO2 is computed by the following equation (5):

$$LO2 = LO2z + OVERFLOW \times B \quad (5)$$

where: $LO2z$=the immediately preceding value of the low speed component LO2, and B=the oxygen storage/release rate of the low speed component.

Here, the oxygen storage/release rate B of the low speed component is set to a positive value less than 1, but actually has different characteristics for storage and release. Further, the real storage/release rate is affected by the catalyst temperature TCAT and the low speed component LO2, so the storage rate and release rate can be set to vary independently. In this case, when the overflow oxygen amount OVERFLOW is positive, oxygen is in excess, and the oxygen storage rate at this time is set to, for example, a value which is larger for higher catalyst temperatures TCAT and for smaller low speed components LO2. Also, when the overflow oxygen amount OVERFLOW is negative, oxygen is deficient, and the oxygen release rate at this time may for example be set to a value which is larger for higher catalyst temperatures TCAT and for larger low speed components LO2.

In steps S42, S43, in the same way as when the high speed component HO2 is computed, it is determined whether or not the computed low speed component LO2 has exceeded a maximum capacity LO2MAX or is less than a minimum capacity LO2MIN, such as zero, for example.

When maximum capacity LO2MAX is exceeded, the routine proceeds to a step S44, an oxygen excess/deficiency amount O2OUT which has overflowed from the low speed component LO2 is computed from the following equation (6):

$$LO2OUT = LO2 - LO2MAX \quad (6)$$

and the low speed component LO2 is limited to the maximum capacity LO2MAX. The oxygen excess/deficiency amount O2OUT flows out downstream of the catalyst 3.

When the low speed component LO2 is less than the minimum capacity LO2MIN, the routine proceeds to a step S45, and the low speed component LO2 is limited to the minimum capacity LO2MIN.

Next, the resetting of the computed value of the oxygen storage amount performed by the controller 6 will be described. By resetting the computed or estimated value of the oxygen storage amount under predetermined conditions, computational errors which have accumulated so far are eliminated, and the computational precision of the oxygen storage amount can be improved.

Figure 9:
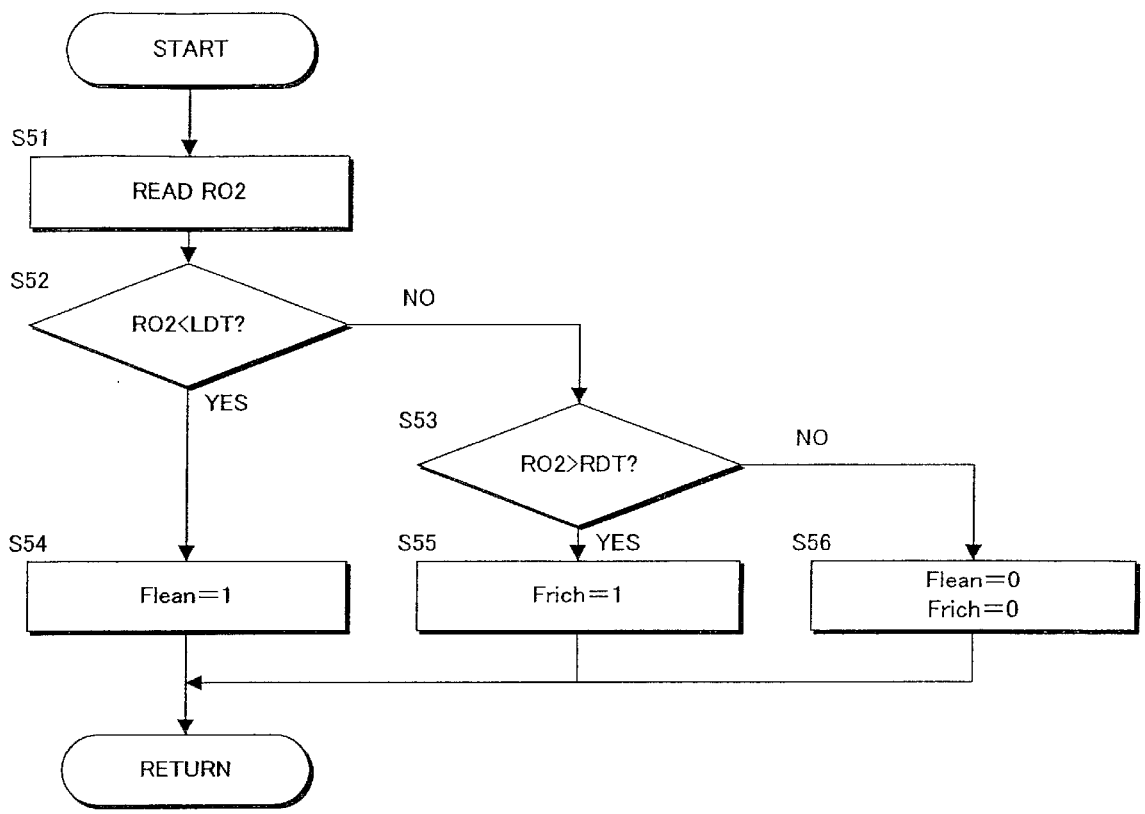
FIG. 9 is a flowchart showing a routine for determining a reset condition.

FIG. 9 shows the details of a routine for determining the reset condition. This routine determines whether or not a condition for resetting the oxygen storage amount (high speed component HO2 and low speed component LO2) holds from the exhaust air-fuel ratio determined downstream of the catalyst 3, and sets a flag Frich and a flag Flean accordingly.

First, in a step S51, the output of the rear oxygen sensor 5 which detects the exhaust air-fuel ratio downstream of the catalyst 3 is read. Subsequently, in a step S52, the rear oxygen sensor output RO2 is compared with a lean determining threshold LDT, and in a step S53, the rear oxygen sensor output RO2 is compared with a rich determining threshold RDT.

As a result of these comparisons, when the rear oxygen sensor output RO2 is less than the lean determining threshold LDT, the routine proceeds to a step S54, and the flag Flean is set to "1" indicating that the lean reset condition for the oxygen storage amount holds. On the other hand, when the rear oxygen sensor output RO2 exceeds the rich determining threshold RDT, the routine proceeds to a step S55, and the flag Frich is set to "1" indicating that the rich reset condition for the oxygen storage amount holds.

When the rear oxygen sensor output RO2 lies between the lean determining threshold LDT and rich determining threshold RDT, the routine proceeds to a step S56, and the flags Flean and Frich are set to "0" showing that the lean reset condition and rich reset condition do not hold.

Figure 10:
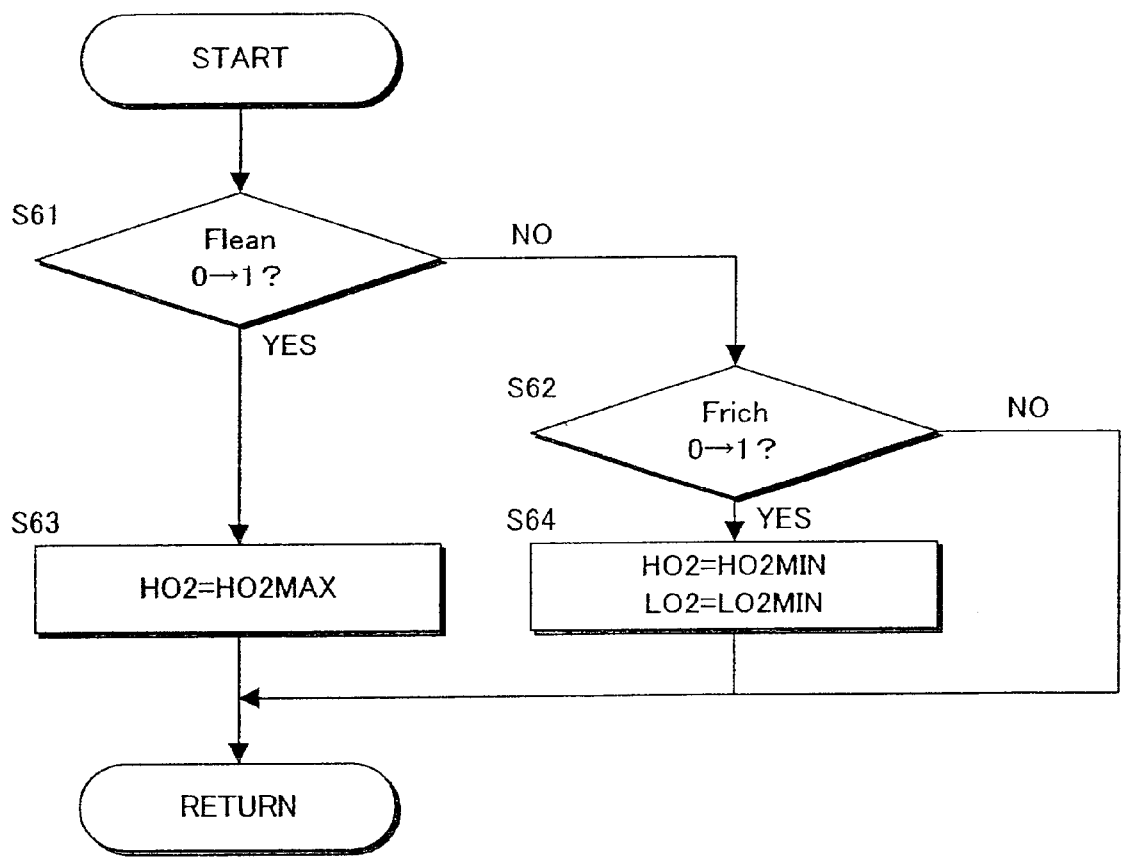
FIG. 10 is a flowchart showing a routine for performing reset of the computed oxygen storage amount.

FIG. 10 shows a routine for resetting the oxygen storage amount.

According to FIG. 10, in steps S61, S62, it is determined whether or not the lean reset conditions or rich reset conditions hold based on the change of the values of the flags Flean and Frich.

When the flag Flean changes from "0" to "1", and it is determined that lean reset conditions hold, the routine proceeds to a step S63, and the high speed component HO2 of the oxygen storage amount is reset to the maximum capacity HO2MAX. At this time, resetting of the low speed component LO2 is not performed. On the other hand, when the flag Frich changes from "0" to "1", and it is determined that rich reset conditions hold, the routine proceeds to a step S64, and the high speed component HO2 and low speed component LO2 of the oxygen storage amount are respectively reset to the minimum capacities HO2MIN, LO2MIN.

The reason why resetting is performed as described above for the lean reset condition is that the oxygen storage rate of the low speed component LO2 is slow, and the oxygen overflows downstream of the catalyst even if the low speed component LO2 has not reached maximum capacity if the high speed component HO2 has reached maximum capacity. In this case the exhaust air-fuel ratio downstream of the catalyst becomes lean, and it is presumed that at least the high speed component HO2 has reached maximum capacity.

When the exhaust air fuel ratio downstream of the catalyst becomes rich, oxygen is not released from the low speed component LO2. Therefore, in this case it is presumed that both the high speed component HO2 and low speed component LO2 are at minimum capacity because no oxygen is being released.

Next, the air-fuel ratio control performed by the controller 6 (oxygen storage amount constant control) will be described.

Figure 11:
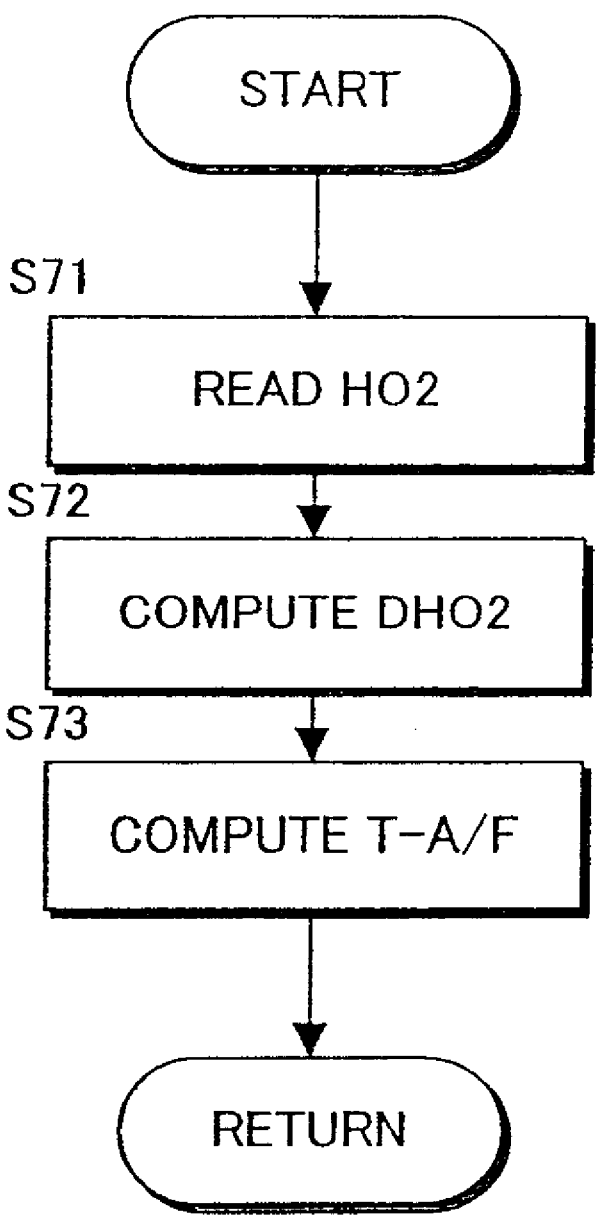
FIG. 11 is a flowchart showing a routine for computing a target air fuel ratio based on the oxygen storage amount.

FIG. 11 shows a routine for computing a target air fuel ratio based on the estimated or computed oxygen storage amount.

According to this, in a step S71, the high speed component HO2 of the present oxygen storage amount is read. In a step S72, a deviation DHO2 (=oxygen excess/deficiency amount required by catalyst 3) between the current high speed component HO2 and a target value TGHO2 of the high speed component, is computed. The target value TGHO2 of the high speed component is set to, for example, half of the maximum capacity HO2MAX of the high speed component.

In a step S73, the computed deviation DHO2 is converted to an air-fuel ratio equivalent value, and a target air-fuel ratio T–A/F of the engine 1 is set.

Therefore, according to this routine, when the high speed component HO2 of the oxygen storage amount is below a target amount, the target air fuel ratio of the engine 1 is set to lean, and the high speed component HO2 of the oxygen storage amount is increased. On the other hand, when the high speed component HO2 exceeds the target amount, the target air fuel ratio of the engine 1 is set to rich, and the high speed component HO2 of the oxygen storage amount is decreased. In this way the high speed component is controlled by controlling the target air fuel ratio.

Next, the overall action performed by the above control will be described.

In an exhaust purification device according to this invention, computation of the oxygen storage amount of the catalyst 3 begins when the engine 1 starts, and the air-fuel ratio of the engine 1 is controlled so that the oxygen storage amount of the catalyst 3 remains constant with a view to maintaining a maximum conversion efficiency of the catalyst.

The oxygen storage amount of the catalyst 3 is estimated based on the measured air-fuel ratio of the exhaust gas flowing into the catalyst 3 and the intake air amount, and computation of the oxygen storage amount is divided into computation of a high speed component HO2 and low speed component LO2 according to the characteristics of these components.

The computation is performed according to a specific model of the characteristics of a high speed component and low speed component. Specifically, the computation is performed assuming that when oxygen is stored, the high speed component HO2 is preferentially stored, and the low speed component LO2 begins to be stored only when oxygen can no longer be stored as the high speed component HO2. The computation also assumes that when oxygen is released, and the ratio (LO2/HO2) of the low speed component LO2 and high speed component HO2 is less than a predetermined threshold value AR, oxygen is preferentially released from the high speed component HO2. When the ratio LO2/HO2 reaches the predetermined value AR, oxygen is assumed to be released from both the low speed component LO2 and high speed component HO2 to maintain this ratio LO2/HO2 constant.

When the high speed component HO2 of the computed oxygen storage amount is larger than the target value, the controller 6 decreases the high speed component by controlling the air-fuel ratio of the engine 1 to be rich, and when it is less than the target value, the high speed component HO2 is increased by controlling the air-fuel ratio to be lean.

As a result, the high speed component HO2 of the oxygen storage amount is controlled to be at the target value. Thus, even if the air-fuel ratio of the exhaust flowing into the catalyst 3 shifts from the stoichiometric air-fuel ratio, oxygen is immediately stored as part of the high speed component HO2 or immediately released from the high speed component HO2 which has a high responsiveness. In this way, the catalyst atmosphere is corrected to the stoichiometric air-fuel ratio, and the conversion efficiency of the catalyst 3 is maintained at a maximum.

If computational errors accumulate, the computed oxygen storage amount shifts from the real oxygen storage amount. However the oxygen storage amount (high speed component HO2 and low speed component LO2) can be reset when the exhaust downstream of the catalyst 3 becomes rich or lean, and any discrepancy between the computed or estimated value and real oxygen storage amount is corrected.

Figure 12:
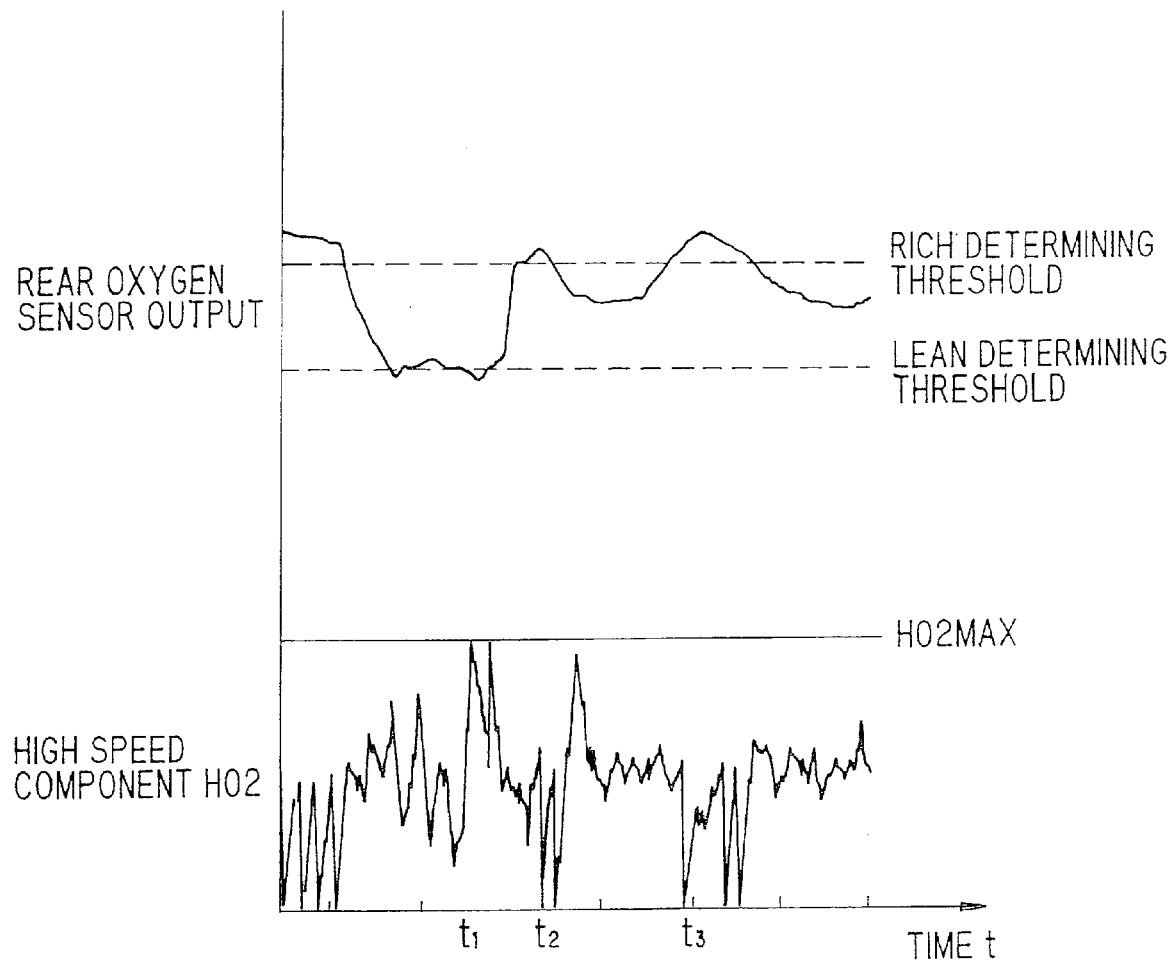
FIG. 12 is a diagram showing how a rear oxygen sensor output and high speed component vary when the oxygen storage amount is controlled to be constant.

FIG. 12 shows how the high speed component HO2 varies when the above oxygen storage amount constant control is performed.

In this case, at the time t1, the output of the rear oxygen sensor 5 becomes less than the lean determining threshold and lean reset conditions hold, so the high speed component HO2 is reset to the maximum capacity HO2MAX. However, the low speed component LO2 is not necessarily a maximum at this time, so reset of the low speed component is not performed. The low speed component LO2 is not shown in FIG. 12.

At times t2, t3, the output of the rear oxygen sensor 5 becomes greater than the rich determining threshold and rich reset conditions hold, so the high speed component HO2 of the oxygen storage amount is reset to the minimum capacity, i.e., zero. The low speed component LO2 at this time is also reset to the minimum capacity.

Thus, resetting of the computed or estimated values of the oxygen storage amount is performed when the air-fuel ratio of the exhaust downstream of the catalyst 3 becomes rich or lean. Because the discrepancy from the real oxygen storage amount is corrected, the computational precision of the oxygen storage amount of the catalyst is further enhanced, the precision of the air-fuel ratio control for maintaining the oxygen storage amount constant is increased, and the conversion efficiency of the catalyst is maintained at a high level.

Next, a second embodiment of this invention will be described.

The construction of the exhaust purification device according to the second embodiment is identical to the construction shown in FIG. 2, but the processing performed by the controller 6 is different. In particular, there is a difference regarding computation or estimation of the oxygen storage amount. In this second embodiment the storage rate of oxygen in the catalyst 3 is determined according to the ratio of the high speed component to the low speed component of the oxygen storage amount. Specifically, whereas in the previous embodiment, the storage rate of the high speed component was a fixed value, in the second embodiment, the storage rate of the high speed component is determined in accordance with the ratio of the high speed component to the low speed component.

The control performed by the controller 6 will be described referring to the flowchart of FIG. 13.

The controller 6 performs lambda control when lambda control conditions (predetermined air-fuel ratio control conditions) hold based on a signal from the front A/F sensor 4 upstream of the catalyst 3. Lambda control means that an air-fuel ratio feedback correction coefficient α is computed so that the average value of the exhaust air-fuel ratio upstream of the catalyst 3 becomes the stoichiometric air-fuel ratio, and a basic injection amount Tp is corrected by this correction coefficient α.

Here, as the sensor 4 upstream of the catalyst 3 is an A/F sensor, the proportional part and integral part may be calculated from:

proportional part=proportional gain×Δ(A/F), and integral part=integral gain×ΣΔ(A/F), where: Δ(A/F)=air-fuel ratio deviation (=real exhaust air-fuel ratio−stoichiometric air-fuel ratio), and proportional plus integral control is performed taking the sum of these as α(=proportional part+integral part).

Figure 13:
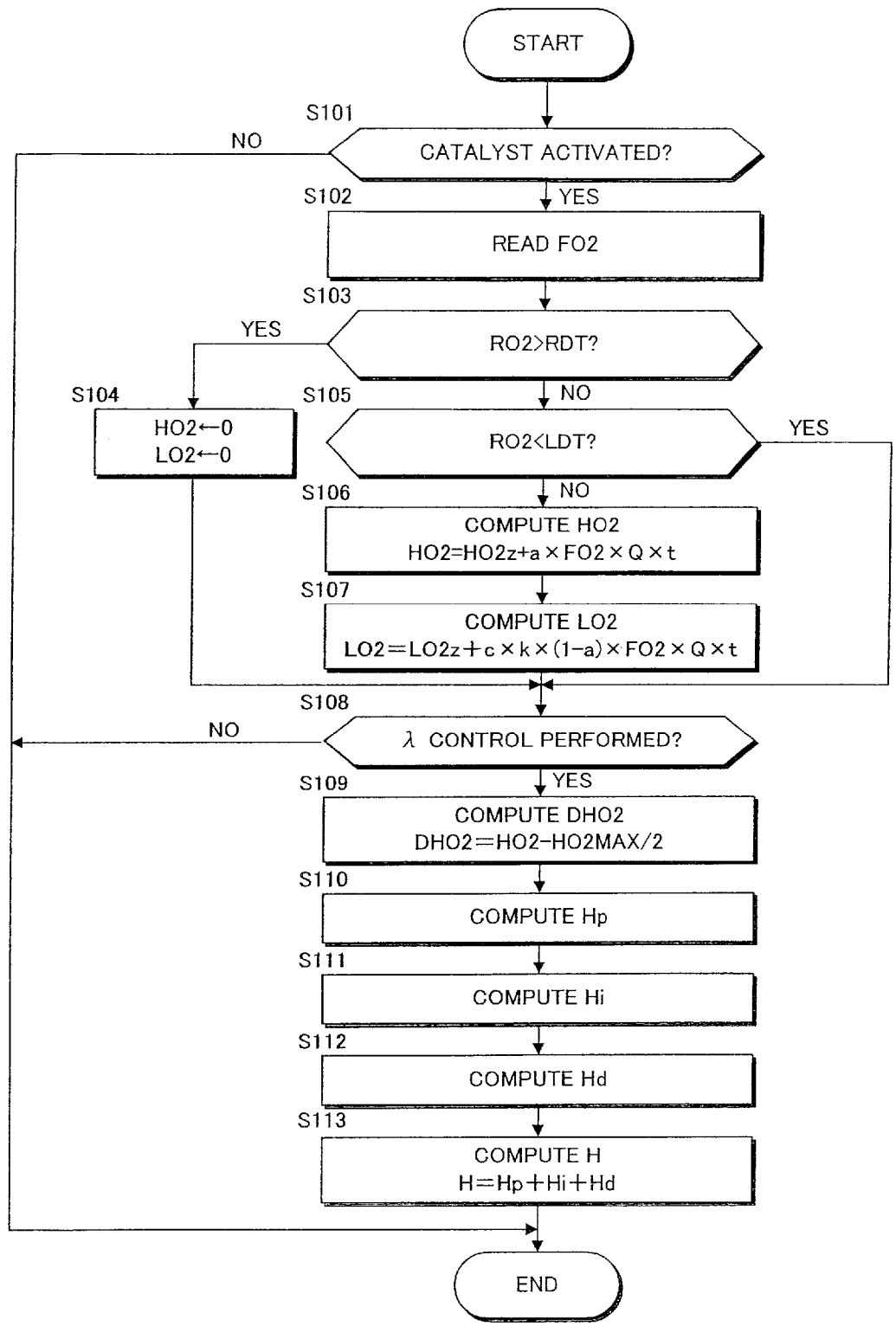
FIG. 13 is a flowchart showing a second embodiment of this invention with the computation of the oxygen storage amount, and a fuel correction control based on the oxygen storage amount.

The processing shown in FIG. 13 is performed at predetermined intervals (e.g., 10 milliseconds) regardless of lambda control.

First, in a step S101, it is determined whether or not the catalyst 3 is activated from conditions such as the cooling water temperature. If the catalyst 3 is not activated, the oxygen storage capacity of the catalyst 3 is not effective, so processing is terminated.

Figure 15:
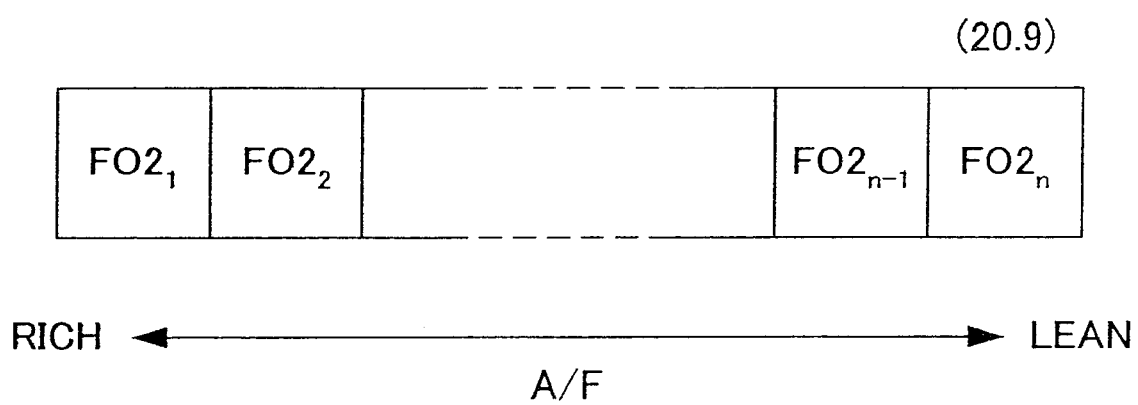
FIG. 15 is a look up table of excess/deficiency oxygen concentration.

If the catalyst 3 is activated, the routine proceeds to a step S102, and the excess/deficiency oxygen concentration FO2 of the exhaust is read from the look up table shown in FIG. 15 based on the output of the front A/F sensor 4.

Figure 14:
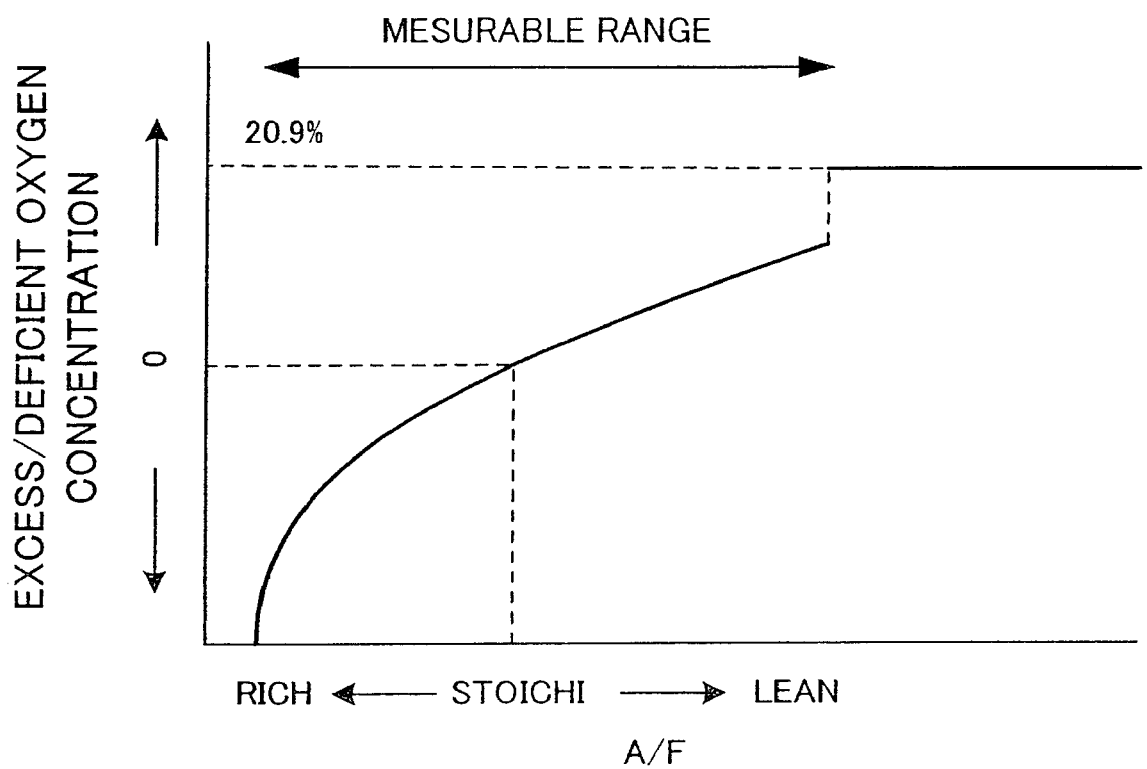
FIG. 14 is a characteristic diagram showing the relation of the output of a wide range air-fuel ratio sensor and an excess/deficiency oxygen concentration.

Here, the excess/deficiency oxygen concentration FO2 of the exhaust is the relative oxygen concentration compared to the oxygen concentration when the air-fuel ratio is stoichiometric, as shown in FIG. 14. Thus FO2 is zero when the air-fuel ratio is stoichiometric. When the exhaust air-fuel ratio is lean, the oxygen concentration is higher than the oxygen concentration at the stoichiometric air-fuel ratio, so FO2 is positive. Conversely, when the exhaust air-fuel ratio is rich, the oxygen concentration is lower than the oxygen concentration at the stoichiometric air-fuel ratio, and FO2 is negative.

Here, the range at which the front A/F sensor can perform measurements is limited, as shown in FIG. 14. Therefore, during fuel cut, the fuel ratio is so lean that it lies outside the measurement range. Thus, the air-fuel ratio during fuel cut, and therefore the excess/deficiency oxygen concentration during fuel cut, cannot be calculated based on the front A/F sensor output.

However, the required air-fuel ratio when the air fuel mixture is burnt lies in a predetermined range, and if an A/F sensor covering the required air-fuel ratio range is used, a lean air-fuel ratio outside the measurement range occurs only during fuel cut. Therefore, if an A/F sensor is provided which is at least sufficient to cover the required air-fuel ratio, and the air-fuel ratio is so lean that it lies outside the measurement range, a value corresponding to the atmosphere (=20.9%) is used as the excess/deficiency oxygen concentration FO2 as shown in FIG. 14. In this way the excess/deficiency oxygen concentration may be calculated even during fuel cut.

Returning now to FIG. 13, in a step S103, the output (RO2) of the rear oxygen sensor 5 downstream of the catalyst is compared with the rich determining threshold RDT. When it is determined that the rear oxygen sensor output RO2 is greater than the rich determining threshold RDT, i.e., when the exhaust air-fuel ratio is rich, it is assumed that the oxygen storage amount of the catalyst 3 is zero. In this case the catalyst 3 is no longer maintaining the air-fuel ratio downstream of the catalyst at the stoichiometric air-fuel ratio, so the routine proceeds to a step S104. In the step S104, the high speed component HO2 and low speed component LO2 are both reset to zero.

On the other hand, when the rear oxygen sensor output RO2 is not greater than the rich determining threshold RDT, the routine proceeds to a step S105, and it is determined whether the rear oxygen sensor output RO2 is less than the lean determining threshold LDT, i.e., whether the exhaust air-fuel ratio is lean. When it is not lean, i.e., and the exhaust air-fuel ratio downstream of the catalyst 3 is equal to the stoichiometric air-fuel ratio, it is assumed that the oxygen due to the fluctuation of the exhaust air-fuel ratio upstream of the catalyst 3 is being absorbed by the catalyst 3, and the routine proceeds to steps S106, S107.

Here, the routine proceeds to the steps S106, S107 regardless of whether lambda control is being performed or not, but in both cases, the exhaust air-fuel ratio downstream of the catalyst 3 is the stoichiometric air-fuel ratio.

In the step S106, the high speed component HO2 is computed by the following equation (7):

$$HO2=HO2z+A2 \times FO2 \times Q \times t \qquad (7)$$

where: HO2z=calculated value of the high speed component on the immediately preceding occasion,
A2=coefficient indicating the oxygen storage rate or release rate of the high speed component,
FO2=excess/deficiency oxygen concentration,
Q=exhaust gas flowrate (represented by intake air flowrate), and
t=cycle time (10 milliseconds).

FO2×Q×t in the second term on the right of equation (7) is the excess/deficiency oxygen amount in unit cycle time (i.e., O2IN). The oxygen amount stored or released as the high speed component in unit cycle time is computed by multiplying by the coefficient A2 which indicates the oxygen storage rate or release rate. The high speed component of the oxygen storage amount is then calculated by adding this to the immediately preceding value HO2z of the high speed component.

The second term on the right-hand side of equation (7), includes the excess/deficiency oxygen amount in unit cycle time, FO2×Q×t. The excess/deficiency amount of oxygen is centered at the oxygen amount at the stoichiometric air-fuel ratio. In other words, when oxygen is in excess, the second term on the right-hand side of equation (7) represents the oxygen amount stored in unit cycle time as the high speed component, and when oxygen is deficient, the second term on the right-hand side of equation (7) represents the oxygen amount released in unit cycle time from the high speed component. The coefficient A2 in this second term determines the rate of oxygen storage when oxygen is in excess, or the rate of oxygen release when oxygen is deficient.

In the step S107, the low speed component LO2 of the oxygen storage amount is computed based on the reaction rate of oxygen storage.

Here, if the oxygen storage reaction in the oxygen storage material is $$R+O_2 \rightarrow RO_2,$$

where: R=the substance (e.g. cerium oxide) which absorbs oxygen by chemical combination, the reaction rate k is

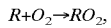

where: [R]=amount of substance R,
[$O_2$]=excess oxygen concentration, and
[$RO_2$]=low speed component of the oxygen storage amount.

The oxygen storage reaction rate is directly proportional to the excess oxygen concentration ([$O_2$]). The rate is also directly proportional to the difference between the amount ([R]) of substance storing oxygen, i.e. the maximum capacity LO2MAX of the low speed component, and the low speed component, LO2z of the oxygen storage amount. The rate is inversely proportional to the low speed component ([$RO_2$]) of the current oxygen storage amount. Therefore, the reaction rate k may be represented by the following equation (8):

$$k=d \times FO2 \times (LO2MAX-LO2z)/LO2z \qquad (8)$$

where d=reaction rate coefficient.

Using this reaction rate k (k<≦1), the low speed component LO2 of the oxygen storage amount is computed by the following equation (9):

$$LO2=LO2z+c \times k \times (FO2 \times Q \times t - A2 \times FO2 \times Q \times t) \qquad (9)$$

where LO2z=the value of the low speed component calculated on the immediately preceding occasion,
c=constant,
Q=exhaust gas flowrate (represented by intake air flowrate), and
t=cycle time (10 milliseconds).

The reaction coefficient k in the above may simply be a constant value.

Here, FO2×Q×t−A2×FO2×Q×t in the second term on the right-hand side of equation (9), is the excess/deficiency oxygen amount in unit cycle time which overflows to the low speed component. Thus, the term FO2×Q×t−A2×FO2×Q×t in equation (9) is similar to FO2×Q×t in the second term on the right-hand side of equation (7). By multiplying this by a constant c×k which determines the rate of oxygen storage or oxygen release, the oxygen amount stored by the oxygen storage material or released from the oxygen storage material in unit cycle time is computed. By adding the second term to the immediately preceding value LO2z, the low speed component of the oxygen storage amount is found.

A2×FO2×Q×t is the oxygen amount released from the high speed component in unit cycle time. FO2×Q×t is the excess/deficiency oxygen amount in unit cycle time. The reason why the oxygen amount stored/released as the low speed component in unit cycle time is computed based on the difference between A2×FO2×Q×t and FO2×Q×t in equation (9), is that although it is believed that oxygen storage by the noble metal and oxygen storage material take place independently, it is believed that oxygen storage by the noble metal occurs preferentially compared to oxygen storage by the oxygen storage material.

When the exhaust gas downstream of the catalyst is lean in the step S105, the steps S106, S107 are skipped, and the routine proceeds to a step S108.

In the step S108, it is determined whether or not lambda control is being performed. As is known, lambda control begins when the front A/F sensor 4 upstream of the catalyst is activated. Lambda control is also stopped during a fuel cut or when the engine has a high load.

If lambda control is being performed, the routine proceeds to PID control in a step S109 and subsequent steps, and when lambda control is not being performed, the step S109 and subsequent steps are not executed. The computation of the high speed component HO2 is always performed once the catalyst has been activated. However, feedback control which controls the high speed component HO2 to coincide with a target value, i.e., air-fuel ratio control is performed so that the high speed component coincides with a predetermined target value, is limited to the case when lambda control is being performed.

In the step S109, there is calculated a difference (deviation DHO2) between the high speed component HO2 of the oxygen storage amount and its target value, for example, ½ the maximum capacity HO2MAX of the high speed component from the equation (10):

$$DHO2 = HO2 - HO2MAX/2 \quad (10)$$

In steps S110, S111 and S112, a proportional part Hp, integral part Hi and differential part Hd of the feedback amount H are respectively computed from the equations:

$$Hp = \text{proportional gain} \times DHO2,$$

$$Hi = \text{integral gain} \times \Sigma DHO2,$$

$$Hd \text{ differential gain} \times (DHO2 - DHO2z)/t,$$

where: t=cycle time (10 milliseconds).

A value obtained by adding Hp, Hi and Hd is set to a fuel correction amount H (feedback amount) in a step S113, and the processing of FIG. 13 is terminated.

The aforesaid maximum capacity HO2MAX of the high speed component is a fixed value which can be determined by experiment.

Using the fuel correction amount H thus obtained, a fuel injection pulse width Ti during a sequential injection is computed by, for example, the equation (11):

$$Ti = Tp \times TFBYA \times \alpha \times H \times 2 + Ts \quad (11)$$

where: Tp=basic injection pulse width,
TFBYA=target equivalent ratio,
$\alpha$=air-fuel ratio feedback correction coefficient, and
Ts=injection pulse width correction.

The fuel injection valve 13 in FIG. 2 opens for the time Ti at a predetermined injection timing once for every two engine rotations per cylinder, and fuel is injected into the air intake passage 7.

Here, Tp, TFBYA, $\alpha$, and Ts on the right-hand side of equation (11) are identical to the prior art, for example, $\alpha$ is 1.0 during fuel cut and TFBYA is 1.0 during lambda control. Ts is an injection pulse width correction according to a battery voltage.

Next, the setting of the aforesaid coefficient A2 will be described referring to the flowchart of FIG. 16. This flowchart is executed at a predetermined interval, for example, 10 milliseconds.

Figure 16:
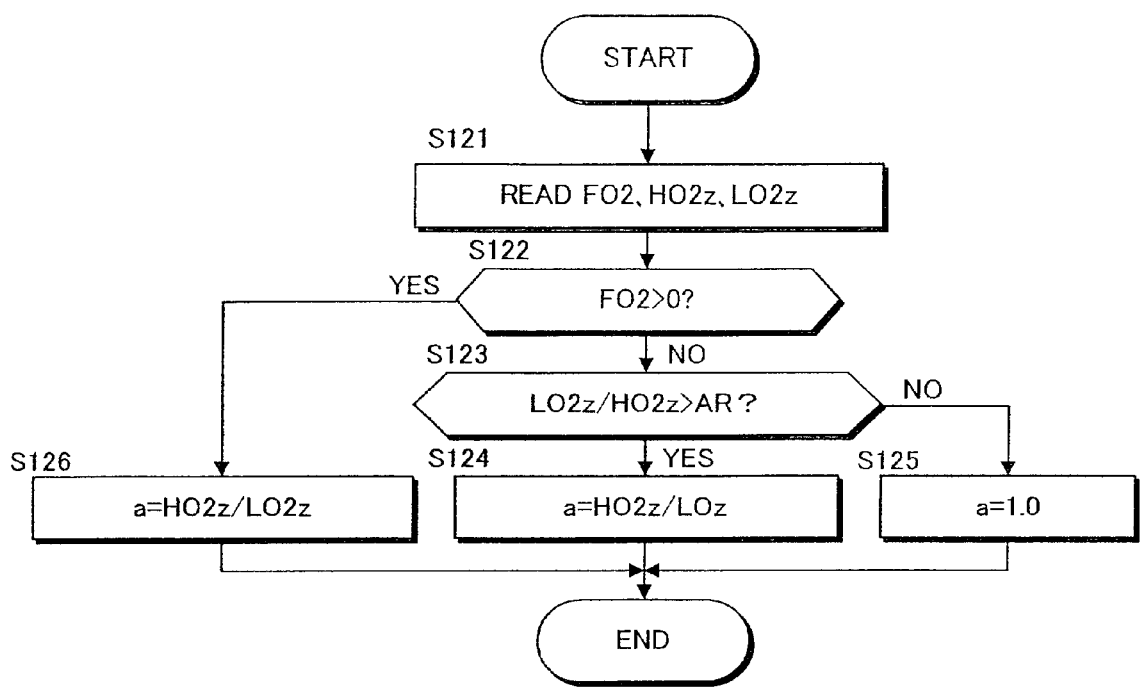
FIG. 16 is a flowchart for describing the setting of a coefficient A2.

In FIG. 16, in a step S121, the excess/deficiency oxygen concentration FO2 upstream of the catalyst 3, the immediately preceding value HO2z of the high speed component and the immediately preceding value LO2z of the low speed component are read. After the processing of FIG. 13 has been performed for the first time, the values of HO2, LO2 are respectively set to HO2z, LO2z as preparation for the second processing step. Therefore, steps S123 or S124 of FIG. 16 cannot be performed before the processing of FIG. 13 is performed for the first time. When the processing of FIG. 13 is performed for the first time, predetermined initial values are substituted for HO2z and LO2z.

In the step S122, the excess/deficiency oxygen concentration FO2 is compared with zero. When FO2 is larger than zero, it is determined that oxygen is being released and the routine proceeds to the step S123. In the step S123, LO2z/HO2z, the ratio of the low speed component to the high speed component of the oxygen storage amount, is compared with a predetermined value (threshold value) AR. When the ratio LO2z/HO2z exceeds the predetermined value AR, the routine proceeds to the step S124, and HO2z/LO2z is substituted in the constant A2 as the rate of oxygen release from the high speed component.

Here, the reason why HO2z/LO2z is used as the oxygen release rate from the high speed component is as follows.

When the noble metal or oxygen storage material is used alone, the oxygen release rate depends on the excess/deficiency oxygen concentration FO2 and the partial pressure of the stored oxygen in the noble metal or oxygen storage material. The oxygen storage amount, and the final oxygen release rate of each component (noble metal and oxygen storage material) when both the noble metal and oxygen storage material are present is determined by the ratio of the two components. In other words, the oxygen release rate from the high speed component is directly proportional to HO2z/LO2z.

The maximum capacity of the low speed component is approximately 10 times larger than the maximum capacity of the high speed component, so HO2z/LO2z in the step S124 is a number approximately equal to ⅒ (value<1.0).

The reason why LO2z/HO2z is compared with the predetermined value in the step S123 instead of HO2z/LO2z is because this value is larger and easier to compare. It will of course be understood that HO2z/LO2z may also be used.

When LO2z/HO2z is less than the predetermined value AR, the routine proceeds from the step S123 to a step S125, and the coefficient A2 is set to 1.0. Here, if LO2z/HO2z is less than the predetermined value AR, it means that the sum of the oxygen release amounts in unit cycle time from the noble metal and oxygen storage material (computed values) is larger than the oxygen amount actually released from the catalyst, and does not express the real state. In this case, HO2z/LO2z is no longer used as the rate of oxygen released from the high speed component. Instead, it is considered that oxygen is released only as the high speed component, and the oxygen release rate for the high speed component at this time (i.e., 1.0) is substituted in the coefficient A2. The oxygen release rate for the high speed component at this time is a maximum.

Figures 17A, 17B, 17C:
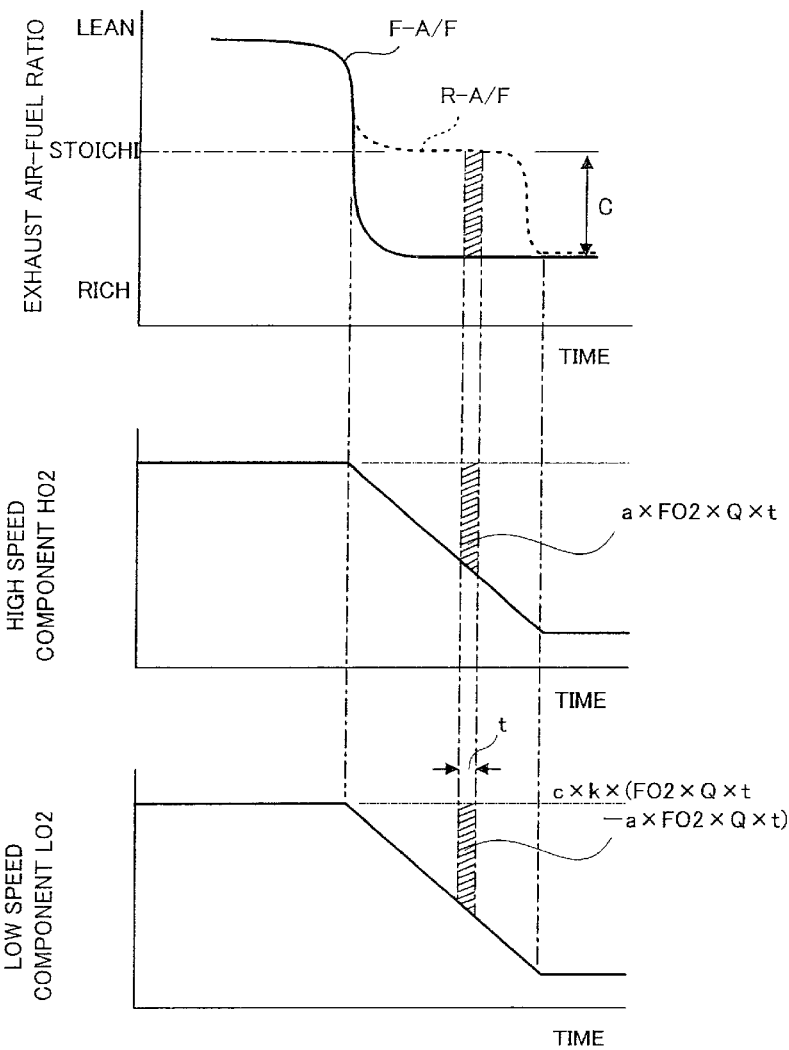
FIG. 17A is a diagram showing the variation of air-fuel ratio before and after the catalyst.
FIGS. 17B and 17C are diagrams showing the oxygen storage amount when the exhaust air fuel ratio is changed from lean to rich.

FIG. 17A shows how the exhaust air-fuel ratio varies before and after the catalyst 3 when the air-fuel ratio of the exhaust flowing into the catalyst 3 changes from lean to rich. FIGS. 17A and 17C show how the oxygen storage amount varies when the air fuel ratio of the exhaust flowing into the catalyst 3 changes from rich to lean.

In this case, in the controller 6, the computation is performed assuming that the amount of oxygen A2×FO2× Q×t is released in unit cycle time from the high speed component as shown in FIG. 17B and the amount of oxygen c×k×(FO2×Q×t−A2×FO2×Q×t) is released in unit cycle time from the low speed component as shown in FIG. 17C. It may be that the sum of the two computed values is larger than the oxygen amount actually released from the catalyst computed from an air-fuel ratio difference C shown in FIG. 17A, such as when there is a restoration from fuel cut. In this case, the oxygen release rate for the high speed component is set ignoring the amount of oxygen released from the low speed component.

Returning to FIG. 16, when FO2 is less than zero, it is determined that oxygen is being stored, and the routine proceeds to a step S126. In the step S126, HO2z/LO2z is substituted in the coefficient A2 as the rate of oxygen storage for the high speed component, as in the step S124.

In the first embodiment, it was assumed that during storage, all of the oxygen was stored as the high speed component until the high speed component reached maximum capacity. However, in practice, not all the oxygen flowing into the catalyst is stored as the high speed component even if the high speed component has not yet reached maximum capacity.

Thus, if the oxygen release rate is computed based on the ratio of the high speed component to the low speed component not only when oxygen is released but also when it is stored as in this embodiment, the high speed component can be computed with a still higher precision. The part of the oxygen which was not stored as the high speed component is stored as the low speed component, and the remainder is released downstream of the catalyst.

Thus, in this embodiment, by performing the computation separately for the high speed component HO2 of the oxygen storage amount of the catalyst which is stored/released quickly, and the low speed component LO2 of the oxygen storage amount of the catalyst which is stored/released slowly, the oxygen release rate for the high speed component can be precisely calculated based on the ratio HO2z/LO2z of the high speed component to the low speed component. The precision of computing the high speed component of the oxygen storage amount can therefore be improved.

When oxygen is released from the catalyst, and LO2z/HO2z, the ratio of the low speed component and high speed component of the oxygen storage amount, is less than the predetermined value (threshold value), it may occur that the sum of the oxygen release amounts for both components calculated by the computation is larger than the oxygen amount which is actually released from the catalyst. In this case, the real state is not represented. In this case, the rate of oxygen release for the high speed component is set ignoring the low speed component, and the real state can be better approximated.

When oxygen is being stored, although oxygen is stored separately in the noble metal and oxygen storage material, the computation, which presumes that oxygen is first removed from the exhaust gas by the noble metal and the remainder of the oxygen is then removed by the oxygen storage material, is believed to match the actual situation. The same is true for release of oxygen. Therefore, according to this embodiment, the oxygen storage amount or oxygen release amount (A2×FO2×Q×t) in the predetermined t is estimated for the noble metal based on the excess/deficiency oxygen amount (FO2×Q×t) in the predetermined time t. The oxygen storage amount or oxygen release amount in the predetermined time is then computed or estimated for the oxygen storage material based on the remaining value (FO2×Q×t−A2×FO2×Q×t). The remaining value is obtained by subtracting this computed oxygen storage/release amount for a predetermined time for the high speed component from the excess/deficiency oxygen amount for a predetermined time. In this way, a precise estimation can be performed for each component.

The high speed component HO2 is computed and the air-fuel ratio is controlled so that HO2 becomes the predetermined target value, for example, ½ of HO2MAX. In this way convergence to the target value is rapid, and the effect of the low speed component, which does not contribute to exhaust performance in a short time, can therefore be ignored.

The oxygen storage amount or oxygen release amount for a predetermined time was computed or estimated for the low speed component based on the value of (FO2×Q×t−A2×FO2×Q×t). obtained by subtracting the oxygen storage/release amount for a predetermined time for the high speed component from the excess/deficiency oxygen amount for a predetermined time. However, the oxygen storage amount or oxygen release amount for a predetermined time may alternatively be computed for the low speed component based on the excess/deficiency oxygen amount (FO2×Q×t) in the predetermined time.

The entire contents of Japanese Patent Applications P2000-34046 (filed Feb. 10, 2000) and P2000-26284 (filed Feb. 3, 2000), from which the present application claims priority, are incorporated herein by reference.

Although the invention has been described above by reference to specific embodiments of the invention, the invention is not limited to the embodiments described above. Modifications and variations of the embodiments described above will occur to those skilled in the art, in light of the above teachings. The scope of the invention is defined with reference to the following claims.

INDUSTRIAL APPLICABILITY

As described above, the exhaust purification device of this invention is useful as an exhaust purification device for an engine provided with a catalyst which stores oxygen in the exhaust passage. The oxygen storage amount of the catalyst can be precisely computed, so control precision which maintains the oxygen storage amount constant can be improved, and purification performance of the exhaust catalyst can be maintained at a high level.

What is claimed is:

1. A method of estimating an oxygen storage amount of a catalyst within a catalytic converter coupled to an engine, comprising:

estimating a first amount of oxygen stored in the catalyst, the first amount representing a part of the oxygen storage amount, the first amount estimated to change at a first rate;

estimating a second amount of oxygen stored in the catalyst, the second amount representing another part of the oxygen storage amount; and wherein the first rate is estimated based on a relationship between the first amount and the second amount.

2. The method of claim 1, wherein the second amount is estimated to change at a second rate, where the first rate is greater than the second rate.

3. The method of claim 1, wherein the first rate is estimated further based on an oxygen concentration of oxygen entering the catalyst.

4. The method of claim 1, further comprising:

setting the first amount of oxygen to a first amount maximum capacity when the first amount of oxygen is estimated to be greater than the first amount maximum capacity.

5. The method of claim 1, further comprising:

setting the second amount of oxygen to a second amount maximum capacity when the second amount of oxygen is estimated to be greater than the second amount maximum capacity.

6. The method of claim 4, further comprising:

estimating an oxygen overflow amount flowing into the second amount when the first amount of oxygen is estimated to be greater than the first amount maximum capacity; and wherein the second amount is estimated based on the oxygen overflow amount.

7. The method of claim 1, further comprising:

determining the air-fuel ratio of the exhaust downstream of the catalyst; and resetting the first amount and second amount to respective minimum capacities when the determined air-fuel ratio has exceeded a rich determining threshold.

8. The method of claim 7, wherein the respective minimum capacities are zero.

9. The method of claim 1, further comprising:
determining the air-fuel ratio of the exhaust downstream of the catalyst; and
resetting the first amount to a first amount maximum capacity when the determined air-fuel ratio is lower than a lean determining threshold.

10. The method of claim 1, wherein the first amount is stored by a noble metal.

11. The method of claim 1, wherein the second amount is stored by an oxygen storage material.

12. A method of estimating an oxygen storage amount of a catalyst within a catalytic converter coupled to an engine, comprising:
estimating a first amount of oxygen stored in the catalyst, the first amount representing a part of the oxygen storage amount, the first amount estimated to be stored at a first rate;
estimating a second amount of oxygen stored in the catalyst, the second amount representing another part of the oxygen storage amount; and
wherein the first rate is estimated based on a relationship between the first amount and the second amount.

13. The method of claim 12, wherein the second amount is estimated to be stored at a second rate, where the first rate is greater than the second rate.

14. The method of claim 13, wherein the second rate is proportional to the ratio of the difference between the second amount maximum capacity and a prior estimate of the second amount, and the prior estimate of the second amount.

15. The method of claim 12, wherein the first rate is estimated further based on an excess oxygen concentration of oxygen entering the catalyst.

16. The method of claim 12, wherein the first rate is estimated based on a ratio of the first amount to the second amount.

17. The method of claim 16, wherein the first rate is proportional to the ratio.

18. The method of claim 12, further comprising:
setting the first amount of oxygen to a first amount maximum capacity when the first amount of oxygen is estimated to be greater than the first amount maximum capacity.

19. The method of claim 12, further comprising:
estimating the second mount of oxygen to be stored at a second rate, wherein the second rate is estimated to be zero when the first amount of oxygen is estimated to be less than a first amount maximum capacity and wherein the second rate is estimated not to be zero when the first amount of oxygen is estimated to be greater than a first amount maximum capacity.

20. A method of estimating an oxygen storage amount of a catalyst within a catalytic converter coupled to an engine, comprising:
estimating a first amount of oxygen stored in the catalyst, the first amount representing a part of the oxygen storage amount, the first amount estimated to be released at a first rate;
estimating a second amount of oxygen stored in the catalyst, the second amount representing another part of the oxygen storage amount; and
wherein the first rate is estimated based on a relationship between the first amount and the second amount.

21. The method of claim 20, wherein the second amount is estimated to be released at a second rate, where the first rate is greater than the second rate.

22. The method of claim 20, wherein the first rate is estimated further based on a deficient oxygen concentration of oxygen entering the catalyst.

23. The method of claim 20, wherein the first rate has a value so that a ratio of the second amount to the first amount is kept constant when the ratio is above a threshold value.

24. The method of claim 23, wherein the ratio is in the range of 5 to 15.

25. The method of claim 24, wherein the ratio is approximately 10.

26. The method of claim 23, wherein the first rate is estimated to be proportional to a deficient oxygen concentration flowing into the catalyst when the ratio is below the threshold value.

27. The method of claim 20, wherein the first rate is estimated based on a ratio of the first amount to the second amount.

28. The method of claim 27, wherein the first rate is estimated to be proportional to the ratio when one divided by the ratio is above a threshold value.

29. The method of claim 28, wherein the first rate is estimated to be proportional to a deficient oxygen concentration flowing into the catalyst when one divided by the ratio is below the threshold value.

30. A method of controlling the oxygen storage amount of a catalyst within a catalytic converter coupled to an engine, comprising:
estimating a first amount of oxygen stored in the catalyst, the first amount representing a part of the oxygen storage amount, the first amount estimated to change at a first rate;
estimating a second amount of oxygen stored in the catalyst, the second amount representing another part of the oxygen storage amount;
wherein the first rate is estimated based on a relationship between the first amount and the second amount; and
controlling an air/fuel ratio of the engine based on the estimated first amount.

31. The method of claim 30, wherein the air/fuel ratio is controlled so that the first amount is controlled to be at a target first amount.

32. The method of claim 31, wherein the target first amount is equal to about one-half of a first amount maximum capacity.

33. The method of claim 30, wherein the second amount is estimated to change at a second rate, where the first rate is greater than the second rate.

34. The method of claim 30, wherein the first rate is estimated further based on an oxygen concentration of oxygen entering the catalyst.

35. The method of claim 30, further comprising:
setting the first amount of oxygen to a first amount maximum capacity when the first amount of oxygen is estimated to be greater than the first amount maximum capacity.

36. The method of claim 30, further comprising:
setting the second amount of oxygen to a second amount maximum capacity when the second amount of oxygen is estimated to be greater than the second amount maximum capacity.

37. The method of claim 35, further comprising:
estimating an oxygen overflow amount flowing into the second amount when the first amount of oxygen is estimated to be greater than the first amount maximum capacity; and
wherein the second amount is estimated based on the oxygen overflow amount.

38. The method of claim 30, further comprising:
determining the air-fuel ratio of the exhaust downstream of the catalyst; and
resetting the first amount and second amount to respective minimum capacities when the determined air-fuel ratio has exceeded a rich determining threshold.

39. The method of claim 38, wherein the respective minimum capacities are zero.

40. The method of claim 30, further comprising:
determining the air-fuel ratio of the exhaust downstream of the catalyst; and
resetting the first amount to a first amount maximum capacity when the determined air-fuel ratio is lower than a lean determining threshold.

41. The method of claim 30, wherein the first amount is stored by a noble metal.

42. The method of claim 30, wherein the second amount is stored by an oxygen storage material.

43. A method of controlling the oxygen storage amount of a catalyst within a catalytic converter coupled to an engine, comprising:
estimating a first amount of oxygen stored in the catalyst, the first amount representing a part of the oxygen storage amount, the first amount estimated to be stored at a first rate;
estimating a second amount of oxygen stored in the catalyst, the second amount representing another part of the oxygen storage amount; and
wherein the first rate is estimated based on a relationship between the first amount and the second amount; and
controlling an air/fuel ratio of the engine based on the estimated first amount.

44. The method of claim 43, wherein the air/fuel ratio is controlled so that the first amount is controlled to be at a target first amount.

45. The method of claim 44, wherein the target first amount is equal to about one-half of a first amount maximum capacity.

46. The method of claim 43, wherein the second amount is estimated to be stored at a second rate, where the first rate is greater than the second rate.

47. The method of claim 46, wherein the second rate is proportional to the ratio of the difference between the second amount maximum capacity and a prior estimate of the second amount, and the prior estimate of the second amount.

48. The method of claim 43, wherein the first rate is estimated further based on an excess oxygen concentration of oxygen entering the catalyst.

49. The method of claim 43, wherein the first rate is estimated based on a ratio of the first amount to the second amount.

50. The method of claim 49, wherein the first rate is proportional to the ratio.

51. The method of claim 43, further comprising:
setting the first amount of oxygen to a first amount maximum capacity when the first amount of oxygen is estimated to be greater than the first amount maximum capacity.

52. The method of claim 43, further comprising:
estimating the second mount of oxygen to be stored at a second rate, wherein the second rate is estimated to be zero when the first amount of oxygen is estimated to be less than a first amount maximum capacity and wherein the second rate is estimated not to be zero when the first amount of oxygen is estimated to be greater than a first amount maximum capacity.

53. A method of controlling the oxygen storage amount of a catalyst within a catalytic converter coupled to an engine, comprising:
estimating a first amount of oxygen stored in the catalyst, the first amount representing a part of the oxygen storage amount, the first amount estimated to be released at a first rate;
estimating a second amount of oxygen stored in the catalyst, the second amount representing another part of the oxygen storage amount;
wherein the first rate is estimated based on a relationship between the first amount and the second amount; and
controlling an air/fuel ratio of the engine based on the estimated first amount.

54. The method of claim 53, wherein the air/fuel ratio is controlled so that the first amount is controlled to be at a target first amount.

55. The method of claim 54, wherein the target first amount is equal to about one-half of a first amount maximum capacity.

56. The method of claim 53, wherein the second amount is estimated to be released at a second rate, where the first rate is greater than the second rate.

57. The method of claim 53, wherein the first rate is estimated further based on a deficient oxygen concentration of oxygen entering the catalyst.

58. The method of claim 53, wherein the first rate has a value so that a ratio of the second amount to the first amount is kept constant when the ratio is above a threshold value.

59. The method of claim 58, wherein the ratio is in the range of 5 to 15.

60. The method of claim 59, wherein the ratio is approximately 10.

61. The method of claim 58, wherein the first rate is estimated to be proportional to a deficient oxygen concentration flowing into the catalyst when the ratio is below the threshold value.

62. The method of claim 53, wherein the first rate is estimated based on a ratio of the first amount to the second amount.

63. The method of claim 62, wherein the first rate is estimated to be proportional to the ratio when one divided by the ratio is above a threshold value.

64. The method of claim 63, wherein the first rate is estimated to be proportional to a deficient oxygen concentration flowing into the catalyst when one divided by the ratio is below the threshold value.

65. An exhaust purification device for an engine, the device comprising:
a catalyst provided in an exhaust passage of the engine;
a front sensor which detects an oxygen concentration of oxygen flowing into the catalyst; and
a microprocessor programmed to:
estimate a first amount of oxygen stored in the catalyst, the first amount estimated to change at a first rate;
estimate a second amount of oxygen stored in the catalyst;
wherein the first rate is estimated based on the oxygen concentration and a relationship between the first amount and the second amount; and
control an air/fuel ratio of the engine based on the estimated first amount.

66. The exhaust purification device of claim 65, wherein the microprocessor estimates the second amount to change at a second rate, where the first rate is greater than the second rate.

67. The exhaust purification device of claim 65, wherein the microprocessor sets the first amount of oxygen to a first amount maximum capacity when the first amount of oxygen is estimated to be greater than the first amount maximum capacity.

68. The exhaust purification device of claim 65, wherein the microprocessor sets the second amount of oxygen to a second amount maximum capacity when the second amount of oxygen is estimated to be greater than the second amount maximum capacity.

69. The exhaust purification device of claim 67, wherein the microprocessor estimates an oxygen overflow amount flowing into the second amount when the first amount of oxygen is estimated to be greater than the first amount maximum capacity; and wherein the second amount is estimated based on the oxygen overflow amount.

70. The exhaust purification device of claim 65, further comprising:

a rear sensor which detects the oxygen concentration of the exhaust flowing out of the catalyst; and wherein the microprocessor resets the first amount and second amount to respective minimum capacities when the air-fuel ratio of the exhaust downstream of the catalyst has exceeded a rich determining threshold.

71. The exhaust purification device of claim 70, wherein the respective minimum capacities are zero.

72. The exhaust purification device of claim 65, further comprising:

a rear sensor which detects the oxygen concentration of the exhaust flowing out of the catalyst; and wherein the microprocessor resets the first amount to a first amount maximum capacity when the air-fuel ratio of the exhaust downstream of the catalyst is lower than a lean determining threshold.

73. The exhaust purification device of claim 65, wherein the first amount is stored by a noble metal.

74. The exhaust purification device of claim 65, wherein the second amount is stored by an oxygen storage material.

75. An exhaust purification device for an engine, the device comprising:

a catalyst provided in an exhaust passage of the engine;

a front sensor which detects an excess oxygen concentration of oxygen flowing into the catalyst; and a microprocessor programmed to:

estimate a first amount of oxygen stored in the catalyst, the first amount estimated to be stored at a first rate;

estimate a second amount of oxygen stored in the catalyst;

wherein the first rate is estimated based on the excess oxygen concentration and a relationship between the first amount and the second amount; and control an air/fuel ratio of the engine based on the estimated first amount.

76. The exhaust purification device of claim 75, wherein the microprocessor estimates the second amount to be stored at a second rate, where the first rate is greater than the second rate.

77. The exhaust purification device of claim 76, wherein the microprocessor estimates the second rate to be proportional to the ratio of the difference between a second amount maximum capacity and a prior estimate of the second amount, and the prior estimate of the second amount.

78. The exhaust purification device of claim 75, wherein the microprocessor estimates the first rate based on a ratio of the first amount to the second amount.

79. The exhaust purification device of claim 78, wherein the microprocessor estimates the first rate to be proportional to the ratio.

80. The exhaust purification device of claim 76, wherein the microprocessor sets the first amount of oxygen to a first amount maximum capacity when the first amount of oxygen is estimated to be greater than the first amount maximum capacity.

81. The exhaust purification device of claim 76, wherein the microprocessor estimates the second mount of oxygen to be stored at a second rate, wherein the second rate is estimated to be zero when the first. amount of oxygen is estimated to be less than a first amount maximum capacity and wherein the second rate is estimated not to be zero when the first amount of oxygen is estimated to be greater than a first amount maximum capacity.

82. An exhaust purification device for an engine, the device comprising:

a catalyst provided in an exhaust passage of the engine;

a front sensor which detects a deficient oxygen concentration of oxygen flowing into the catalyst; and a microprocessor programmed to:

estimate a first amount of oxygen stored in the catalyst, the first amount estimated to be released at a first rate;

estimate a second amount of oxygen stored in the catalyst;

wherein the first rate is estimated based on the deficient oxygen concentration and a relationship between the first amount and the second amount; and control an air/fuel ratio of the engine based on the estimated first amount.

83. The exhaust purification device of claim 82, wherein the microprocessor estimates the second amount to be released at a second rate, where the first rate is greater than the second rate.

84. The exhaust purification device of claim 82, wherein the first rate has a value so that a ratio of the second amount to the first amount is kept constant when the ratio is above a threshold value.

85. The exhaust purification device of claim 84, wherein the ratio is in the range of 5 to 15.

86. The exhaust purification device of claim 85, wherein the ratio is approximately 10.

87. The exhaust purification device of claim 84, wherein the microprocessor estimates the first rate to be proportional to the deficient oxygen concentration when the ratio is below the threshold value.

88. The exhaust purification device of claim 82, wherein the microprocessor estimates the first rate based on a ratio of the first amount to the second amount.

89. The exhaust purification device of claim 88, wherein the microprocessor estimates the first rate to be proportional to the ratio when one divided by the ratio is above a threshold value.

90. The exhaust purification device of claim 89, wherein the microprocessor estimates the first rate to be proportional to the deficient oxygen concentration when one divided by the ratio is below the threshold value.

* * * * *